United States Patent
He et al.

(10) Patent No.: US 10,380,798 B2
(45) Date of Patent: Aug. 13, 2019

(54) PROJECTILE OBJECT RENDERING FOR A VIRTUAL REALITY SPECTATOR

(71) Applicant: Sony Interactive Entertainment America LLC, San Mateo, CA (US)

(72) Inventors: Shawn He, San Mateo, CA (US); Matthew DeVico, San Mateo, CA (US); Mohammed Kahn, San Mateo, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days.

(21) Appl. No.: 15/721,660

(22) Filed: Sep. 29, 2017

(65) Prior Publication Data
US 2019/0102939 A1 Apr. 4, 2019

(51) Int. Cl.
*G06T 19/00* (2011.01)
*A63F 13/86* (2014.01)
*H04N 5/225* (2006.01)

(52) U.S. Cl.
CPC ............ *G06T 19/003* (2013.01); *A63F 13/86* (2014.09); *H04N 5/2254* (2013.01); *G06T 19/006* (2013.01)

(58) Field of Classification Search
CPC ................................ G06T 19/00; G06T 17/20
USPC ......................................................... 345/419
See application file for complete search history.

(56) References Cited

U.S. PATENT DOCUMENTS

| | | | | |
|---|---|---|---|---|
| 5,850,352 A | * | 12/1998 | Moezzi | G06T 15/10 345/419 |
| 2008/0146302 A1 | * | 6/2008 | Olsen | A63F 13/213 463/7 |
| 2012/0004956 A1 | * | 1/2012 | Huston | H04W 4/21 705/14.1 |
| 2015/0258431 A1 | * | 9/2015 | Stafford | A63F 13/213 463/31 |
| 2015/0362733 A1 | * | 12/2015 | Spivack | A63F 13/26 345/633 |
| 2016/0192009 A1 | * | 6/2016 | Sugio | H04N 21/4756 725/32 |
| 2016/0217614 A1 | * | 7/2016 | Kraver | G06T 19/006 |
| 2016/0322078 A1 | * | 11/2016 | Bose | G11B 27/031 |
| 2016/0366342 A1 | * | 12/2016 | Vonolfen | G06T 7/20 |
| 2017/0006322 A1 | * | 1/2017 | Dury | H04N 21/254 |
| 2017/0243359 A1 | * | 8/2017 | Bose | G06T 7/20 |
| 2017/0300755 A1 | * | 10/2017 | Bose | G06K 9/00724 |
| 2017/0365102 A1 | * | 12/2017 | Huston | G06T 19/006 |

* cited by examiner

*Primary Examiner* — Jin Ge
(74) *Attorney, Agent, or Firm* — Penilla IP, APC

(57) ABSTRACT

A method is provided, including the following operations: receiving at least one video feed from at least one camera disposed in a venue; processing the at least one video feed to generate a video stream that provides a view of the venue; transmitting the video stream over a network to a client device, for rendering to a head-mounted display; wherein processing the at least one video feed includes, analyzing the at least one video feed to identify a projectile object that is launched in the venue, wherein in the video stream, the projectile object is replaced with a virtual object, the virtual object being animated in the video stream so as to exhibit a path of travel that is towards the head-mounted display as the video stream is rendered to the head-mounted display.

21 Claims, 17 Drawing Sheets

PROJECTILE OBJECT RENDERING FOR A VIRTUAL REALITY SPECTATOR

BACKGROUND

1. Field of the Disclosure

The present disclosure relates to projectile object rendering for a virtual reality spectator.

2. Description of the Related Art

Electronic sports (e-sports) generally refers to a form of sports where the primary aspects of the sport are facilitated by electronic systems, wherein the input of players and teams as well as the output of the e-sports system are mediated by human-computer interfaces. (See, e.g., Juho Hamari, Max Sjöblom, (2017) "What is eSports and why do people watch it?", Internet Research, Vol. 27 Issue: 2, pp. 211-232, incorporated by reference herein). In practical terms, e-sports encompasses competitive and professional video gaming events that are spectated. E-sports can be spectated live in-person (e.g. at a tournament venue), via online broadcasts or online streaming, and via television broadcast, by way of example without limitation. Many e-sports events take the form of organized tournaments, featuring a multiplayer video game competition, especially between teams of players that may include both amateur and professional players. Common video game genres associated with e-sports include real-time strategy (RTS), fighting, first-person shooter (FPS), and multiplayer online battle arena (MOBA).

Video games are executed by computing devices such as personal computers, game consoles, mobile devices, etc. One example of a gaming platform is the Sony Playstation4® (PS4), which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD.

It is in this context that implementations of the disclosure arise.

SUMMARY

Implementations of the present disclosure include devices, methods and systems relating to projectile object rendering for a virtual reality spectator.

In some implementations, a method is provided, including the following operations: receiving at least one video feed from at least one camera disposed in a venue; processing the at least one video feed to generate a video stream that provides a view of the venue; transmitting the video stream over a network to a client device, for rendering to a head-mounted display; wherein processing the at least one video feed includes, analyzing the at least one video feed to identify a projectile object that is launched in the venue, wherein in the video stream, the projectile object is replaced with a virtual object, the virtual object being animated in the video stream so as to exhibit a path of travel that is towards the head-mounted display as the video stream is rendered to the head-mounted display.

In some implementations, the replacement of the projectile object with the virtual object and the animation of the virtual object are in response to a detected gesture by a user of the head-mounted display.

In some implementations, the gesture is defined by raising of a hand of the user.

In some implementations, analyzing the at least one video feed further includes tracking movement of the projectile object.

In some implementations, analyzing the at least one video feed further includes using the tracked movement to determine a predicted landing location of the projectile object in the venue.

In some implementations, the replacement of the projectile object with the virtual object and the animation of the virtual object are in response to the predicted landing location being within a predefined distance of a location in the venue that is associated to a user of the head-mounted display.

In some implementations, the view of the venue that is provided by the video stream is from a perspective that is substantially defined by the location that is associated to the user of the head-mounted display.

In some implementations, the location that is associated to the user of the head-mounted display is defined by a seat location in the venue.

In some implementations, the replacement of the projectile object with the virtual object occurs along a trajectory of the projectile object.

In some implementations, the at least one video feed includes two or more video feeds, and wherein processing the at least one video feed includes stitching the two or more video feeds together.

In some implementations, a non-transitory computer readable medium is provided, having program instructions embodied thereon that, when executed by at least on computing device, cause said at least one computing device to perform a method including the following operations: receiving at least one video feed from at least one camera disposed in a venue; processing the at least one video feed to generate a video stream that provides a view of the venue; transmitting the video stream over a network to a client device, for rendering to a head-mounted display; wherein processing the at least one video feed includes, analyzing the at least one video feed to identify a projectile object that is launched in the venue, wherein in the video stream, the projectile object is replaced with a virtual object, the virtual object being animated in the video stream so as to exhibit a path of travel that is towards the head-mounted display as the video stream is rendered to the head-mounted display.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 9A-1 and 9A-2 illustrate a head-mounted display (HMD), in accordance with an implementation of the disclosure.

DETAILED DESCRIPTION

The following implementations of the present disclosure provide devices, methods, and systems relating to projectile object rendering for a virtual reality spectator. It will be obvious, however, to one skilled in the art, that the present disclosure may be practiced without some or all of the specific details presently described. In other instances, well known process operations have not been described in detail in order not to unnecessarily obscure the present disclosure.

In various implementations, the methods, systems, image capture objects, sensors and associated interface objects (e.g., gloves, controllers, peripheral devices, etc.) are configured to process data that is configured to be rendered in substantial real-time on a display screen. Broadly speaking, implementations are described with reference to the display being of a head mounted display (HMD). However, in other implementations, the display may be of a second screen, a display of a portable device, a computer display, a display panel, a display of one or more remotely connected users (e.g., whom may be viewing content or sharing in an interactive experience), or the like.

Figure 1A:
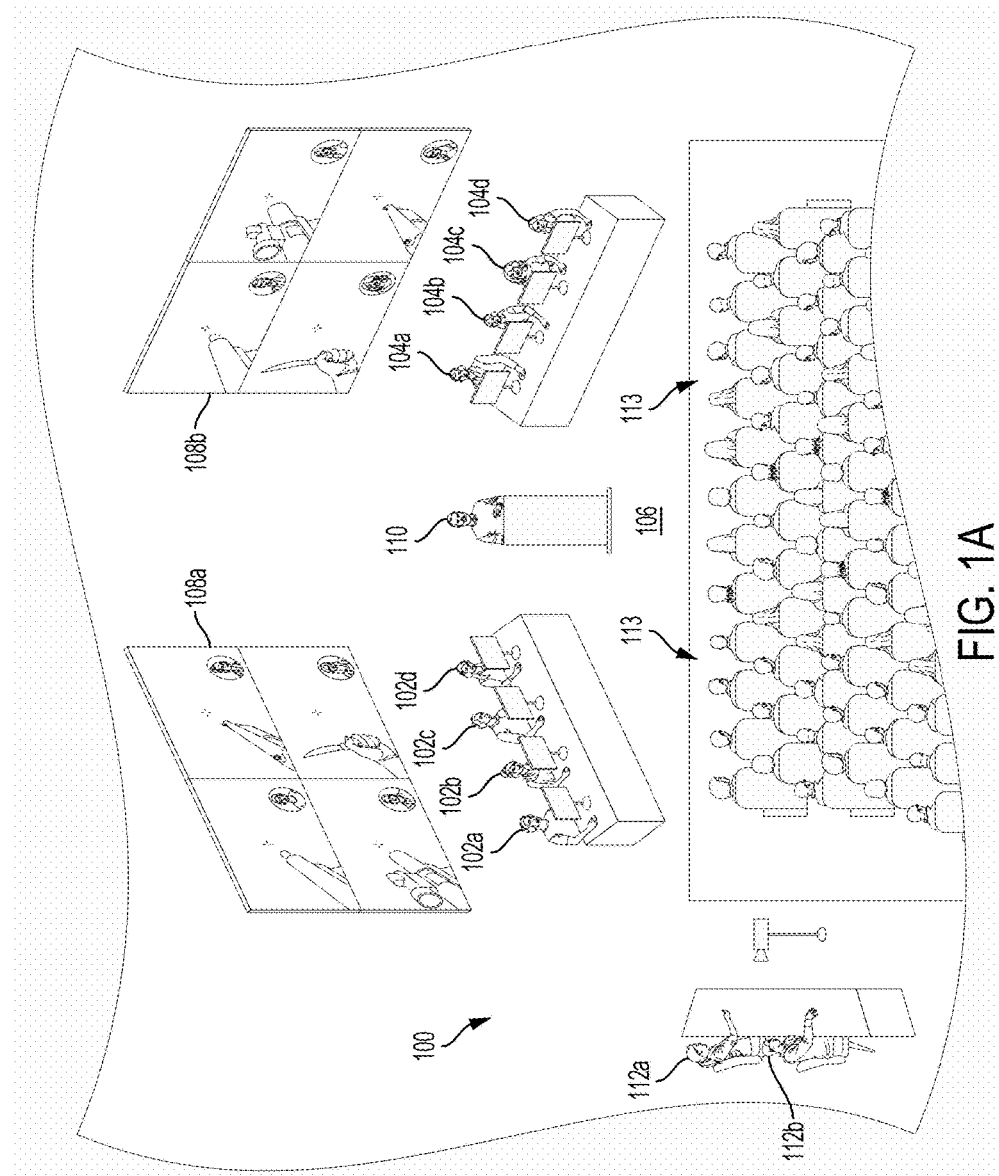
FIG. 1A illustrates a view of an electronic sports (e-sports) venue, in accordance with implementations of the disclosure.

FIG. 1A illustrates a view of an electronic sports (e-sports) venue, in accordance with implementations of the disclosure. E-sports generally refers to competitive or professional gaming that is spectated by various spectators or users, especially multi-player video games. As the popularity of e-sports has increased in recent years, so has the interest in live spectating of e-sports events at physical venues, many of which are capable of seating thousands of people. A suitable venue can be any location capable of hosting an e-sports event for live spectating by spectators, including by way of example without limitation, arenas, stadiums, theaters, convention centers, gymnasiums, community centers, etc.

However, the hosting and production of an e-sports event such as a tournament at a discreet physical venue means that not all people who wish to spectate in person will be able to do so. Therefore, it is desirable to provide a live experience to a remote spectator so that the remote spectator can experience the e-sports event as if he/she were present in-person at the venue where the e-sports event occurs.

With continued reference to FIG. 1A, a view of a venue 100 that is hosting an e-sports event is shown. A typical e-sports event is a tournament wherein teams of players compete against each other in a multi-player video game. In the illustrated implementation, a first team consists of players 102a, 102b, 102c, and 102d, and a second team consists of players 104a, 104b, 104c, and 104d. The first and second teams are situated on a stage 106, along with an announcer/host 110. The first team and second team are engaged in competitive gameplay of a multi-player video game against each other at the venue 100, and spectators 113 are present to view the event.

Large displays 108a, 108b, and 108c provide views of the gameplay to the spectators 113. It will be appreciated that the displays 108a, 108b, and 108c may be any type of display known in the art that is capable of presenting gameplay content to spectators, including by way of example without limitation, LED displays, LCD displays, DLP, etc. In some implementations, the displays 108*a*, 108*b*, and 108*c* are display screens on which gameplay video/images are projected by one or more projectors (not shown). It should be appreciated that the displays 108*a* 108*b*, and 108*c* can be configured to present any of various kinds of content, including by way of example without limitation, gameplay content, player views of the video game, game maps, a spectator view of the video game, views of commentators, player/team statistics and scores, advertising, etc.

Additionally, commentators 112*a* and 112*b* provide commentary about the gameplay, such as describing the gameplay in real-time as it occurs, providing analysis of the gameplay, highlighting certain activity, etc.

Figure 1B:
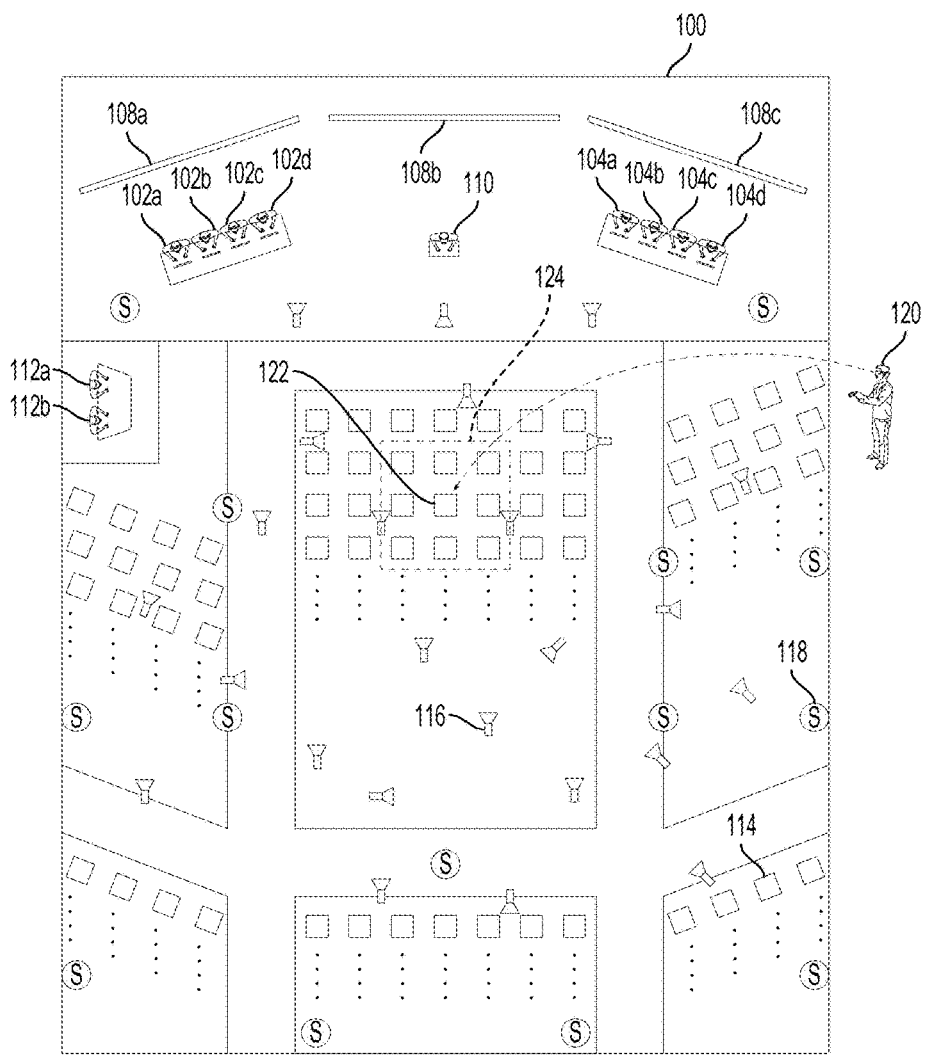
FIG. 1B is a conceptual overhead view of the venue, in accordance with implementations of the disclosure.

FIG. 1B is a conceptual overhead view of the venue 100, in accordance with implementations of the disclosure. As previously described, a first team and a second team of players are situated on the stage and engaged in gameplay of the multi-player video game. A number of seats 114 are conceptually shown, which are available for spectators to occupy when attending and viewing the e-sports event in person. As noted, there are large displays 108*a*, 108*b*, and 108*c* which provide views of the gameplay and other content for the spectators 113 to view. Additionally, there are a number of speakers 118, which may be distributed throughout the venue to provide audio for listening by the spectators, including audio associated with or related to any content rendered on the displays 108*a*, 108*b*, and 108*c*.

Furthermore, there are any number of cameras 116 distributed throughout the venue 100, which are configured to capture video of the e-sports event for processing, distribution, streaming, and/or viewing by spectators, both live in-person and/or remote, in accordance with implementations of the disclosure. It will be appreciated that some of the cameras 116 may have fixed locations and/or orientations, while some of the cameras 116 may have variable locations and/or orientations and may be capable of being moved to new locations and/or re-oriented to new directions.

In accordance with implementations of the disclosure, a "live" viewing experience of the e-sports event can be provided to a virtual reality spectator 120. That is, the virtual reality spectator 120 is provided with a view through a head-mounted display (HMD) (or virtual reality headset) that simulates the experience of attending the e-sports event in person and occupying a particular seat 122 at the venue 100. Broadly speaking, the three-dimensional (3D) location of the virtual reality spectator's seat 122 can be determined, and video feeds from certain ones of the various cameras 116 can be stitched together to provide a virtual reality view of the venue 100 from the perspective of the seat 122.

Furthermore, though not specifically shown, each camera may include at least one microphone for capturing audio from the venue 100. Also, there may be additional microphones distributed throughout the venue 100. Audio from at least some of these microphones can also be processed based on the 3D location of the virtual reality spectator's seat 122, so as to provide audio that simulates that which would be heard from the perspective of one occupying the seat 122.

Figure 1C:
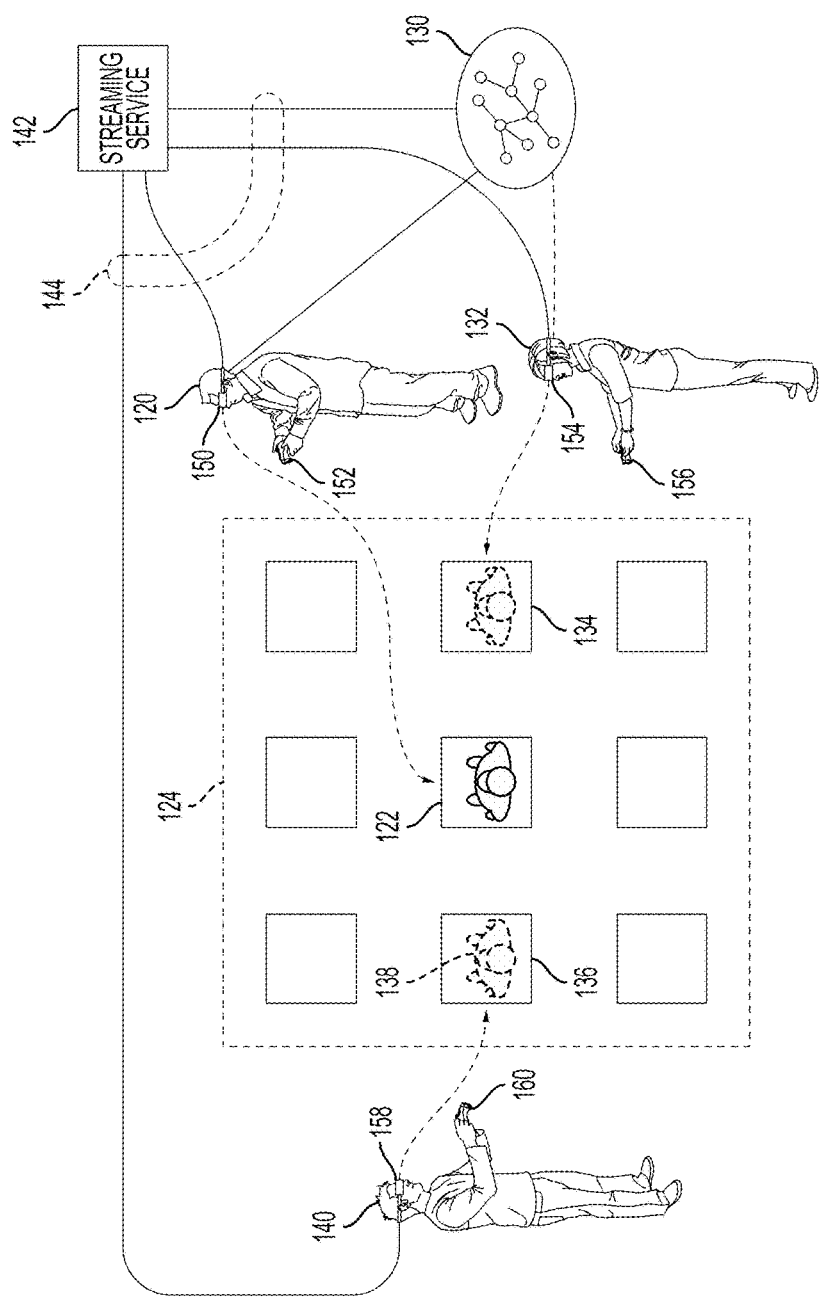
FIG. 1C conceptually illustrates a portion of seats from the venue in which the live e-sports event takes place, in accordance with implementations of the disclosure.

FIG. 1C conceptually illustrates a portion 124 of seats from the venue 100 in which the live e-sports event takes place, in accordance with implementations of the disclosure. As shown, the virtual reality spectator 120 is presented with a view through the HMD 150 that simulates occupying the seat 122 in the venue 100. In some implementations, the view of the e-sports event that is provided to the virtual reality spectator 120 is provided from a streaming service 142 over a network 144. That is, the streaming service 142 includes one or more server computers that are configured to stream video for rendering on the HMD 150, wherein the rendered video provides the view of the e-sports event to the virtual reality spectator 120. Though not specifically shown in the illustrated implementation, it should be appreciated that the streaming service 142 may first transmit the video in the form of data over the network 144 to a computing device that is local to the virtual reality spectator 120, wherein the computing device may process the data for rendering to the HMD 150.

It should be appreciated that the view provided is responsive in real-time to the movements of the virtual reality spectator 120, e.g., so that if the virtual reality spectator 120 turns to the left, then the virtual reality spectator 120 sees (through the HMD 150) the view to the left of the seat 122, and if the virtual reality spectator 120 turns to the right, then the virtual reality spectator 120 sees (through the HMD 150) the view to the right of the seat 122, and so forth. In some implementations, the virtual reality spectator 120 is provided with potential views of the e-sports venue 100 in all directions, including a 360 degree horizontal field of view. In some implementations, the virtual reality spectator 120 is provided with potential views of the e-sports venue 100 in a subset of all directions, such as a horizontal field of view of approximately 270 degrees in some implementations, or 180 degrees in some implementations. In some implementations, the provided field of view may exclude a region that is directly overhead or directly below. In some implementations, a region that is excluded from the field of view of the e-sports venue may be provided with other content, e.g. advertising, splash screen, logo content, game-related images or video, etc.

In some implementations, the virtual reality spectator 120 is able to select the seat through an interface, so that they may view the e-sports event from the perspective of their choosing. In some implementations, the seats that are available for selection are seats that are not physically occupied by spectators who are present in-person at the e-sports event. In other implementations, both seats that are unoccupied and seats that are occupied are selectable for virtual reality spectating.

In some implementations, the streaming service 142 may automatically assign a virtual reality spectator to a particular seat. In some implementations, this may be the best available seat (e.g. according to a predefined order or ranking of the available seats).

In some implementations, virtual reality spectators may be assigned to seats in proximity to other spectators based on various characteristics of the spectators. In some implementations, virtual reality spectators are assigned to seats based, at least in part, on their membership in a social network/graph. For example, with continued reference to FIG. 1C, another virtual reality spectator 132 may be a friend of the virtual reality spectator 120 on a social network 130 (e.g. as defined by membership in a social graph). The streaming service 142 may use this information to assign the virtual reality spectator 132 to a seat proximate to the virtual reality spectator 120, such as the seat 134 that is next to the seat 122 to which the virtual reality spectator 120 has been assigned. In the illustrated implementation, thus virtually "seated," when the virtual reality spectator 120 turns to the right, the virtual reality spectator 120 may see the avatar of the virtual reality spectator 132 seated next to them.

In some implementations, the interface for seat selection and/or assignment may inform a given user that one or more of their friends on the social network 130 is also virtually attending the e-sports event, and provide an option to be automatically assigned to a seat in proximity to one or more of their friends. In this way, friends that are attending the same event as virtual reality spectators may enjoy the event together.

In various implementations, virtual reality spectators can be assigned to seats in proximity to each other based on any of various factors such as a user profile, age, geo-location, primary language, experience in a given video game, interests, gender, etc.

In some implementations, these concepts can be extended to include in-person "real" spectators (who are physically present, as opposed to virtual reality spectators), when information is known about such real spectators. For example, it may be determined that the real spectator 138 that is seated in seat 136 is a friend of the virtual reality spectator 120, and so the virtual reality spectator 120 may be assigned (or offered to be assigned) to the seat 122 that is next to the seat 136 of the real spectator 138.

It will be appreciated that in order to provide input while viewing content through HMDs, the virtual reality spectators may use one or more controller devices. In the illustrated implementation, the virtual reality spectators 120, 132, and 140 operate controller devices 152, 156, and 160, respectively, to provide input to, for example, start and stop streaming of video for virtual reality spectating, select a seat in the e-sports venue 100 for spectating, etc.

It will be appreciated that spectators, whether virtual or real, may in some implementations, hear each other if they are in proximity to each other in the e-sports venue 100. For example, the virtual reality spectators 120 and 132 may hear each other as audio captured from their respective local environments (e.g. via microphones of the HMDs 150 and 154, the controllers 152 and 156, or elsewhere in the local environments of the spectators 120 and 132) is provided to the other's audio stream. In some implementations, the virtual reality spectator 120 may hear sound from the real spectator 138 that is captured by a local microphone.

In some implementations, a virtual reality spectator may occupy a seat that is physically occupied by a real spectator. For example, in the illustrated implementation, the virtual reality spectator may occupy the seat 136 that is physically occupied by the real spectator 138. The virtual reality spectator 140 is provided with a view simulating being in the position of the seat 136. When the virtual reality spectator 140 turns to the right they may see the avatar of the spectator 120; and likewise when the spectator 120 turns to their left, they may see the avatar of the spectator 140 in place of the real spectator 138.

Though implementations of the present disclosure are generally described with reference to e-sports events, it should be appreciated that in other implementations, the principles of the present disclosure can be applied to other types of spectated live events, including by way of example without limitation, sporting events, concerts, ceremonies, presentations, etc.

At e-sports events and other types of live spectated events, it is a common practice for there to be giveaways of various kinds of souvenirs, promotional products, or other items to engage the spectating audience and promote excitement amongst the attendees. Items such as t-shirts, towels, stuffed animals and toys, and other items may be thrown or launched into a spectating audience, so as to be caught by a real spectator at the event. However, a virtual reality spectator is not able to interact with such items because the virtual reality spectator is not physically present at the event, and cannot physically catch such items. However, in order to enable virtual reality spectators to engage in such giveaways, implementations of the present disclosure provide for specialized rendering of the view provided to the virtual reality spectator to enable the virtual reality spectator to experience a sensation of participating in such interactions.

Figure 2:
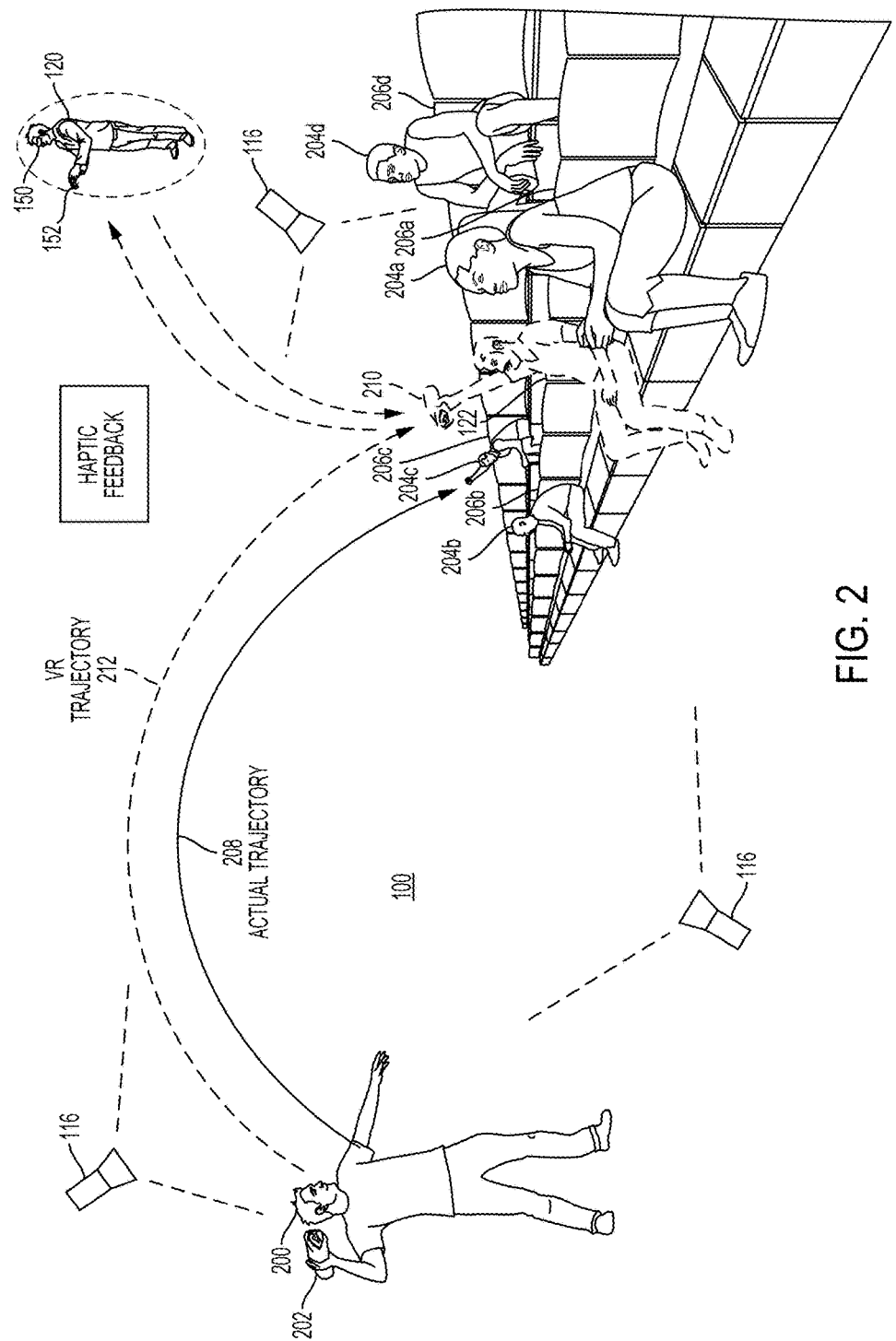
FIG. 2 illustrates an interactive experience for a virtual reality spectator with a projectile object in a venue, in accordance with implementations of the disclosure.

FIG. 2 illustrates an interactive experience for a virtual reality spectator with a projectile object in a venue, in accordance with implementations of the disclosure. In the illustrated implementation, the virtual reality spectator 120 virtually occupies the seat 122 in the venue 100. As previously discussed, the virtual reality spectator 120 is presented a view of the venue 100 that simulates the perspective of viewing the venue from the location of the seat 122, or a location similar to that of the seat 122. Also shown in the illustrated implementation, are real spectators 204a, 204b, 204c, and 204d, who are situated proximately to the seat 122 (to which virtual reality spectator 120 is assigned) who respectively occupy seats 206a, 206b, 206c, and 206d.

A launcher 200 in the illustrated implementation is a person throwing a projectile object 202 towards the spectators. It will be appreciated that in other implementations, the launcher 200 can also include a mechanized device for launching objects that may be operated by such a person, such as a slingshot, gun, cannon, or any other device capable of launching objects towards spectators in accordance with implementations of the disclosure. In the illustrated implementation, the projectile object 202 is a rolled up t-shirt, by way of example without limitation, but may be any other object that may be launched into a group of spectators, as described above.

The launcher 200 launches/throws the projectile object 202 towards the spectators in the venue 100. Accordingly, the projectile object 202 follows an actual or real trajectory 208 or flight path indicated at reference 208, by way of example. However, in some implementations, the view provided to the virtual reality spectator 120 will show the projectile object 202 replaced by a virtual object 210 that will appear to the virtual reality spectator 120 to follow a virtual reality trajectory 212 that is directed towards the virtual reality spectator 120. Thus, even though the actual trajectory 208 of the projectile object 202 is not directed towards the seat 122 to which the virtual reality spectator 120 is assigned, the virtual reality spectator 120 is nonetheless able to experience a view that shows the virtual object 210 being launched/thrown towards the virtual reality spectator 120, thereby providing the virtual reality spectator 120 with the experience of participating in the giveaway.

In some implementations, the virtual object 210 is configured to look similar to the projectile object 202. In other implementations, the virtual object 210 is configured to look like a different object than the projectile object 202. In some implementations, replacing the projectile object 202 with the virtual object 210 includes detecting the projectile object 202 and processing the video feed to remove the projectile object 202 in the video feed, while also inserting the virtual object 210 into the video feed. In some implementations, the virtual object 210 is inserted as an overlay in the video feed. In some implementations, the projectile object 202 is not replaced in the view, but rather the view is augmented and/or overlayed to show the virtual object 210 in addition to the projectile object 202.

Furthermore, to heighten the experience of participation, the virtual reality spectator 120 may "catch" the virtual object 210 by, for example, lifting their hands and making a catching or reaching motion or otherwise moving their hands in a manner so as to indicate a desire on the part of the virtual reality spectator 120 to catch the virtual object 210. The motion of the virtual reality spectator's 120 hands to catch the virtual object 210 can be detected through one or more controller devices 152 that are operated by the virtual reality spectator 120. For example, the virtual reality spectator 120 may operate one or more motion controllers or use a glove interface for supplying input while viewing the venue space through the HMD 150.

As the virtual object 210 is caught, the view rendered to the HMD 150 may show virtual hands, such as the hands of an avatar of the virtual reality spectator 120, catching the virtual object 210. In some implementations, an external camera of the HMD 150 may capture images of the user's hands, and these captured images may be used to show the user's hands catching the virtual object 210. Additionally, haptic feedback can be provided to the virtual reality spectator 120 in response to catching the virtual object 210. Haptic feedback may be rendered to the virtual reality spectator 120, for example, through a controller device 152 operated by the virtual reality spectator 120.

In some implementations, the projectile object 202 is replaced with the virtual object 210 in the virtual reality spectator 120 view at or prior to launch of the projectile object 202 occurring. In some implementations, the projectile object 202 is replaced with the virtual object 210 upon recognition or identification of the projectile object 202 as described below. In some implementations, replacement of the projectile object 202 with the virtual object 210 does not occur until after launch of the projectile object 202 occurs. In some implementations, the launcher 200 is replaced in the virtual reality spectator 120 view with a virtual character that is animated to show the virtual object 210 being launched/thrown by the virtual character. In some implementations, the timing of such a launch by a virtual character is coordinated to the launch of the projectile object 202 by the launcher 200.

In some implementations, in order to facilitate the replacement of the projectile object 202 with the virtual object 210 in the view for the virtual reality spectator 120, the projectile object 202 is identified and/or tracked. It will be appreciated that various technologies can be utilized to identify and track the projectile object 202. In some implementations, the video feeds from one or more of the cameras 116 in the venue can be analyzed to identify and track the location and trajectory of the projectile object 202. That is, an image recognition process can be applied to image frames of the video feeds to identify and track the projectile object 202 in the image frames of the video feeds. It will be appreciated that by tracking the projectile object 202 in multiple different video feeds, the accuracy and robustness of the tracking can be improved.

To further improve such identification and tracking via image recognition, the projectile object 202 itself can be configured to be more recognizable. By way of example without limitation, the projectile object 202 may have one or more colors, markers, patterns, designs, shapes, reflective material, retroreflective material, etc. on its surface to enable it to be more easily recognized via image recognition processes. In some implementations, the projectile object 202 includes one or more lights (e.g. LEDs). In some implementations, such configurations are part of the packaging of the projectile object 202.

While image recognition has been described as a technique for tracking the projectile object 202, it will be appreciated that in other implementations, other types of tracking techniques can be employed, such as RF tracking, magnetic tracking, etc. To this end, the projectile object 202 may include various emitters or sensors, and wireless communications devices to enable such tracking.

In some implementations, the launcher 200 can also be identified and tracked through image recognition applied to the video feeds and/or other techniques. For example, the launcher 200 might be tracked to detect a throwing motion or other indication that the projectile object 202 is being launched. In some implementations, when such a throwing or launching motion is detected, then the projectile object 202 is replaced in the view of the virtual reality spectator 120 with the virtual object 210, so that the "launch" of the virtual object 210 coincides with the actual launch of the projectile object 202.

In some implementations, the launcher 200 and projectile object 202 are replaced in the virtual reality spectator 120 view by a virtual character that is animated so as to launch the virtual object 210 towards the virtual reality spectator 120.

As noted previously, in some implementations, the projectile object 202 is not necessarily replaced by the virtual object 210, but the virtual object 210 is rendered or overlayed in addition to the projectile object 202.

Figure 3:
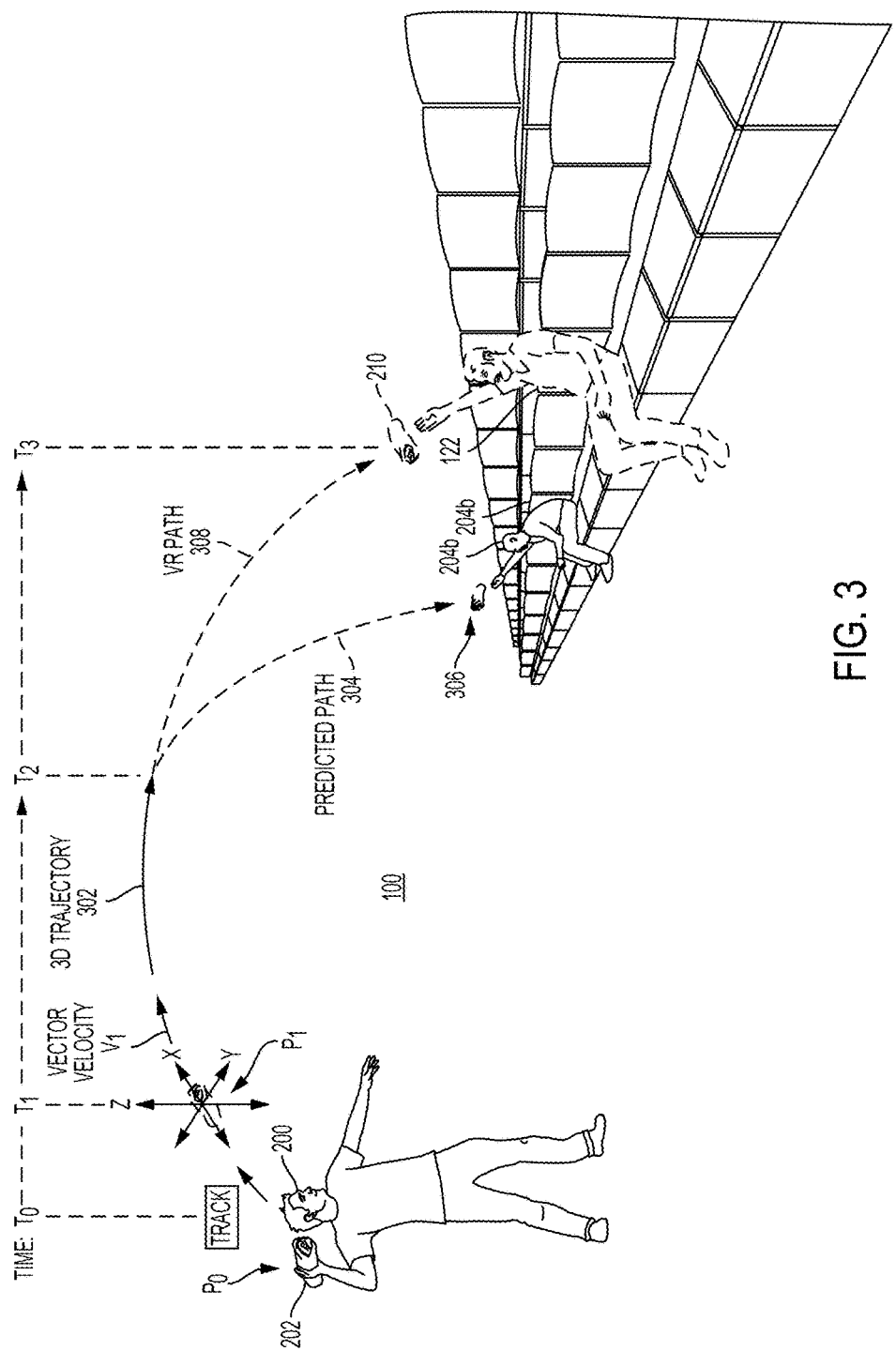
FIG. 3 illustrates prediction of a trajectory of a projectile object 202 for determining a view of a virtual reality spectator 120, in accordance with implementations of the disclosure.

FIG. 3 illustrates prediction of a trajectory of a projectile object 202 for determining a view of a virtual reality spectator 120, in accordance with implementations of the disclosure. In the illustrated implementation, the launcher 200 is shown throwing/launching the projectile object 202. As has been noted, the 3D location/trajectory of the projectile object 202 can be tracked in space. The trajectory of the projectile object 202 is its actual flight path through the real space of the venue 100.

In some implementations, the tracked location of the projectile object 202 in 3D space is used to predict its trajectory or flight path. By way of example without limitation, using the tracked location over time, the 3D vector velocity of the projectile object 202 at a given time can be determined. With reference to the illustrated implementation, at a time $T_0$, the projectile object 202 has an initial potion $P_0$, as it is being launched by the launcher 200. After being launched, at a subsequent time $T_1$, the projectile object 202 has a position $P_1$. By tracking the change in position of the projectile object 202, its velocity at time $T_1$ can be determined as $V_1$, which is a 3D velocity vector in some implementations.

The instantaneous velocity of the projectile object 202 can be utilized to predict the future trajectory of the projectile object 202. With continued reference to FIG. 3, the projectile object 202 is shown to have an actual trajectory 302. And based on determining the velocity of the projectile object 202, it is predicted that the projectile object 202 will follow a predicted trajectory (or flight path) 304, which in the illustrated implementation, is towards the user 304*b* who is located proximate to the location of seat 122, to which the virtual reality spectator 120 is assigned. The predicted trajectory 304 thus also provides for a predicted landing location 306 of the projectile object 202. In some implementations, the predicted landing location 306 is defined by an identified seat in the venue 100, such as the seat 206*b* that is occupied by the real spectator 204*b* in the illustrated implementation.

Based in part on the proximity of the location or seat 122 (to which the virtual reality spectator 120 is assigned) to the predicted trajectory 304 and/or the predicted landing location 306 of the projectile object 202, then the virtual reality spectator 120 view may be altered to show the projectile object 202 or a substituted virtual object 210 that appears to follow a path towards the virtual reality spectator 120 (e.g. towards the seat 122). In the illustrated implementation, this occurs at time $T_2$, at which point the view provided to the virtual reality spectator 120 is modified to show the virtual object 210 following a virtual trajectory/path 308 that is directed towards the seat 122.

Figure 4:
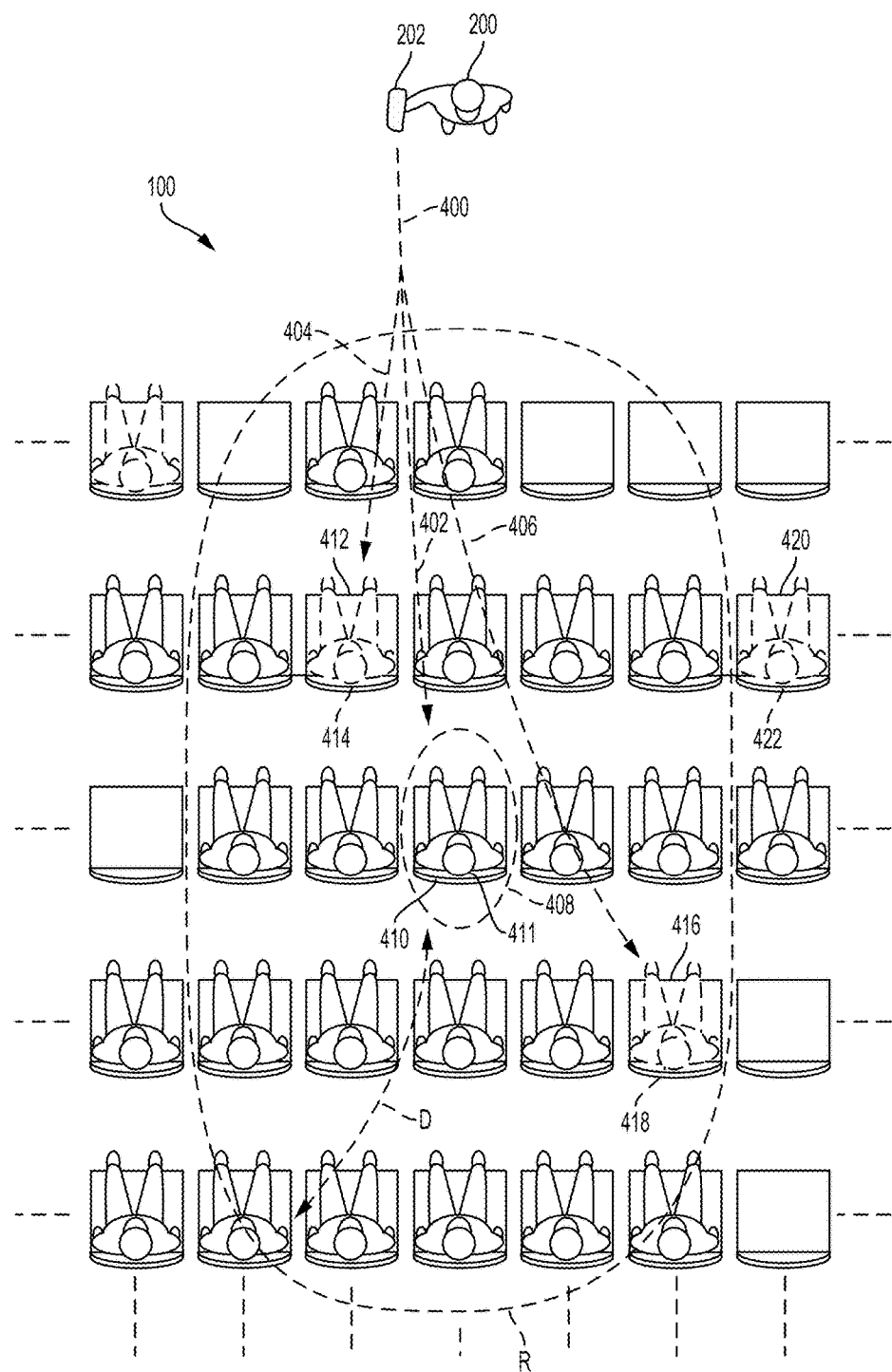
FIG. 4 conceptually illustrates an overhead view of a plurality of seats in a venue, illustrating a method for identifying virtual reality spectators that may have their views altered, in accordance with implementations of the disclosure.

FIG. 4 conceptually illustrates an overhead view of a plurality of seats in a venue, illustrating a method for identifying virtual reality spectators that may have their views altered, in accordance with implementations of the disclosure. As shown, a number of spectators, who may be real or virtual reality spectators, are shown occupying various seats in a venue 100. A launcher 200 is shown in the venue launching/throwing a projectile object 202 towards the spectators.

The launched projectile object 202 follows a trajectory 400 through the air towards the spectators. As noted above, the trajectory can be predicted based on tracking the movement of the projectile object 202 and determining its 3D velocity vector, by way of example without limitation. In the illustrated implementation, such a process is performed to determine a predicted (3D) trajectory 402 of the projectile object 202. Based on the predicted trajectory 402, a predicted landing location 408 is determined for the projectile object 202. In some implementations, the predicted landing location can be a location on a physical surface in the venue 100 that intersects with the predicted trajectory 402. In some implementations, the predicted landing location is defined by a point or region in the venue 100. In some implementations, the predicted landing location identifies a seat within the venue 100 which the predicted trajectory 402 intersects, or substantially intersects. In some implementations, the predicted landing location identifies a seat that is nearest to a point/region in the venue 100 that the predicted trajectory 402 intersects.

In the illustrated implementation, the predicted landing location 408 of the projectile object 202 is shown, which is defined by the location of seat 410, which is occupied by a real spectator 411. In some implementations, a virtual reality spectator that occupies a seat in proximity to the predicted landing location 408 (or seat 410) may have their view of the projectile object 202 modified to show the projectile object 202 or a virtual object 210 following a path that is directed towards them instead of the projectile object's 202 actual path.

For example, in some implementations, a virtual reality spectator occupying a seat that is within a predefined set of proximately located seats may have their view modified. In the illustrated implementation, virtual reality spectators that occupy seats in the region R, that identifies a plurality of seats proximate to the seat 410, may have their views modified. In the illustrated implementation, the seats 412 and 416 are occupied by virtual reality spectators 414 and 418, respectively, and thus the virtual reality spectators 414 and 418 may have their respective views of the venue 100 modified to show a virtual object 210 following a trajectory 404 and 406, respectively.

In some implementations, a virtual reality spectator that is located (e.g. occupying a seat) that is within a predefined distance D of the predicted landing location 408 may have their view modified. In other implementations, various kinds of spatial criteria related to the predicted trajectory 402 and/or predicted landing location 408 of the projectile object 202 may be applied to determine whether a given virtual reality spectator may have their view modified to show a virtual object traveling towards them. By way of example without limitation, in some implementations, virtual reality spectators that occupy locations that are positioned substantially along the predicted trajectory (predicted path of travel) of the projectile object 202 may have their views modified.

In some implementations, the modification of a virtual reality spectator's view takes place automatically based on their location in accordance with the above. In some implementations, the location of the virtual reality spectator renders him/her eligible to have their view modified, for example, further based on additional factors, such as detecting a gesture of the virtual reality spectator (e.g. reaching towards the projectile object 202 as viewed through the HMD).

Figure 5:
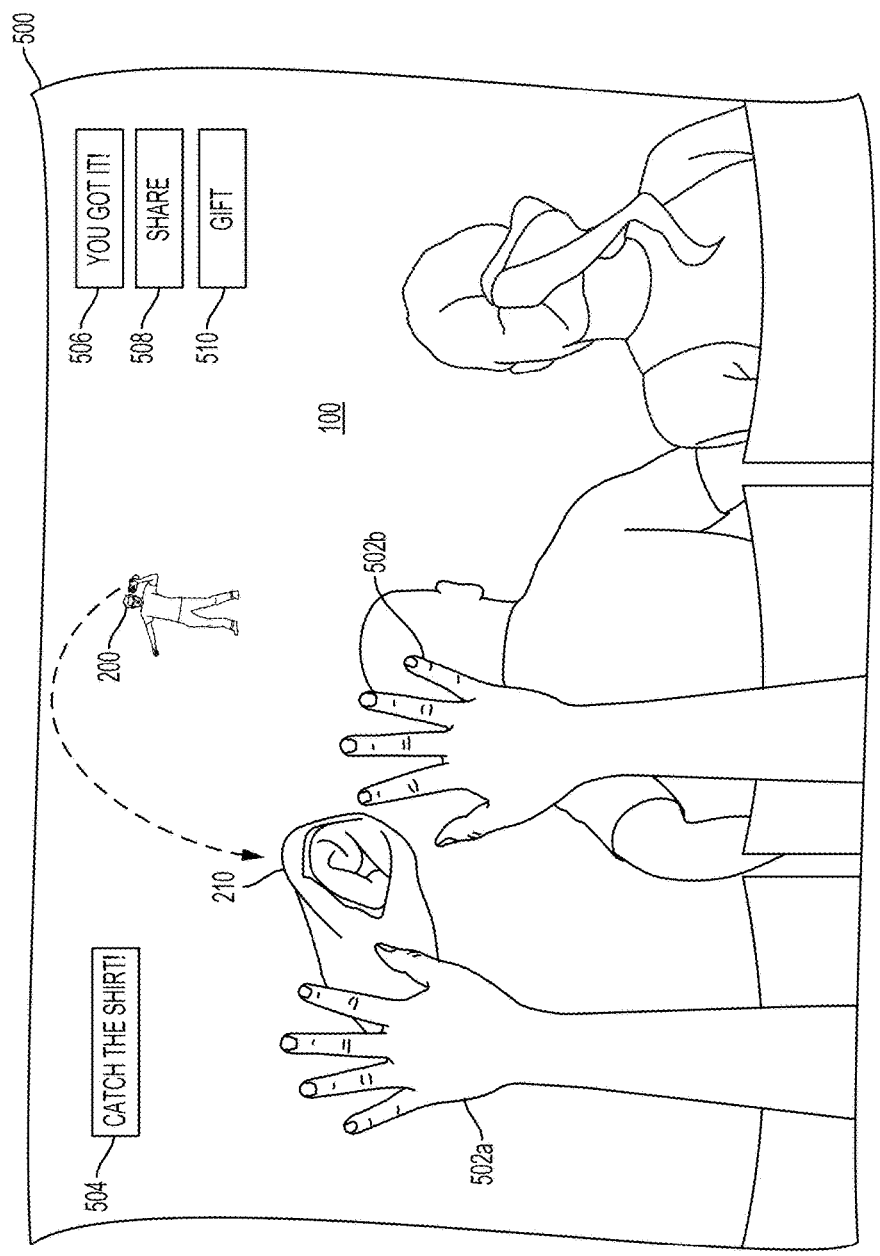
FIG. 5 illustrates a view of a venue provided to a virtual reality spectator, providing interactivity with a projectile object, in accordance with implementations of the disclosure.

FIG. 5 illustrates a view of a venue provided to a virtual reality spectator, providing interactivity with a projectile object, in accordance with implementations of the disclosure. The view 500 is rendered through the HMD 150 for viewing by the virtual reality spectator 120, as previously described. The view 500 is a real-time view of the venue 100 from a perspective that is defined by a location or seat in the venue to which the virtual reality spectator 120 is assigned or otherwise virtually positioned or associated.

In the view 500, the virtual reality spectator 120 may see the launcher 200 throw or launch a projectile object 202 as previously discussed. However, even though the virtual reality spectator 120 is not physically present in the venue to participate in the giveaway, as has been described, the view 500 may be modified to show a virtual object 210 that is rendered so as to appear to the virtual reality spectator 120 to follow a trajectory that is towards the virtual reality spectator 120 location in the venue 100. Thus, the virtual reality spectator 120 is able to virtually catch the virtual object 210 as shown. By way of example without limitation, the virtual reality spectator 120 may see rendered images of his/her hands or corresponding virtual hands 502a and 502b of the virtual reality spectator's 120 avatar. For example, the virtual hands 502a and 502b may be controlled by input from one or more input devices, such as controller devices (including motion controllers), motion sensors, glove interfaces, etc. When the virtual reality spectator 120 "catches" the virtual object 210, haptic feedback can be provided through the input devices that are operated by the virtual reality spectator 120 in order to simulate or reinforce the sensation of catching the virtual object 210.

Additionally, because the virtual reality spectator 120 is wearing an HMD 150, additional functionality can be provided through the HMD display. For example, messages relating to the giveaway can be displayed to the virtual reality spectator 120. For example, a message 504 can be displayed when the launcher 200 is going to launch the projectile object 202, informing the virtual reality spectator 120 to catch the projectile object 202. In some implementations, when the virtual reality spectator 120 catches the corresponding virtual object 210, a confirmation message 506 can be displayed through the HMD, informing the virtual reality spectator 120 that he/she caught the item. For example, if a t-shirt giveaway has occurred in the venue, then when the virtual reality spectator 120 catches the corresponding virtual object 210, their account (e.g. an online user account) may be credited to receive a t-shirt through the mail, a digital t-shirt for their avatar, or receive some other physical or digital item. Examples of items that might be received include, coupons, promotion codes, special offers, credit (e.g. for a digital store), video game assets (e.g. items, skins, characters, weapons, etc.), by way of example without limitation.

In some implementations, after catching a virtual object 210, an option 508 to share the experience with others (e.g. via posting to a social network, e-mail, message, etc.) can be provided. By selecting the option 508 to "Share," then the virtual reality spectator 120 view may display an interface to enable sharing about their catching the virtual object 210, and/or inviting others to join the event and participate, for example via a social network or other platform. In some implementations, after catching a virtual object 210 an option 510 to gift the item that has been credited to their account is provided. That is, the virtual reality spectator 120 may digitally transfer the item to another user or spectator.

Figure 6:
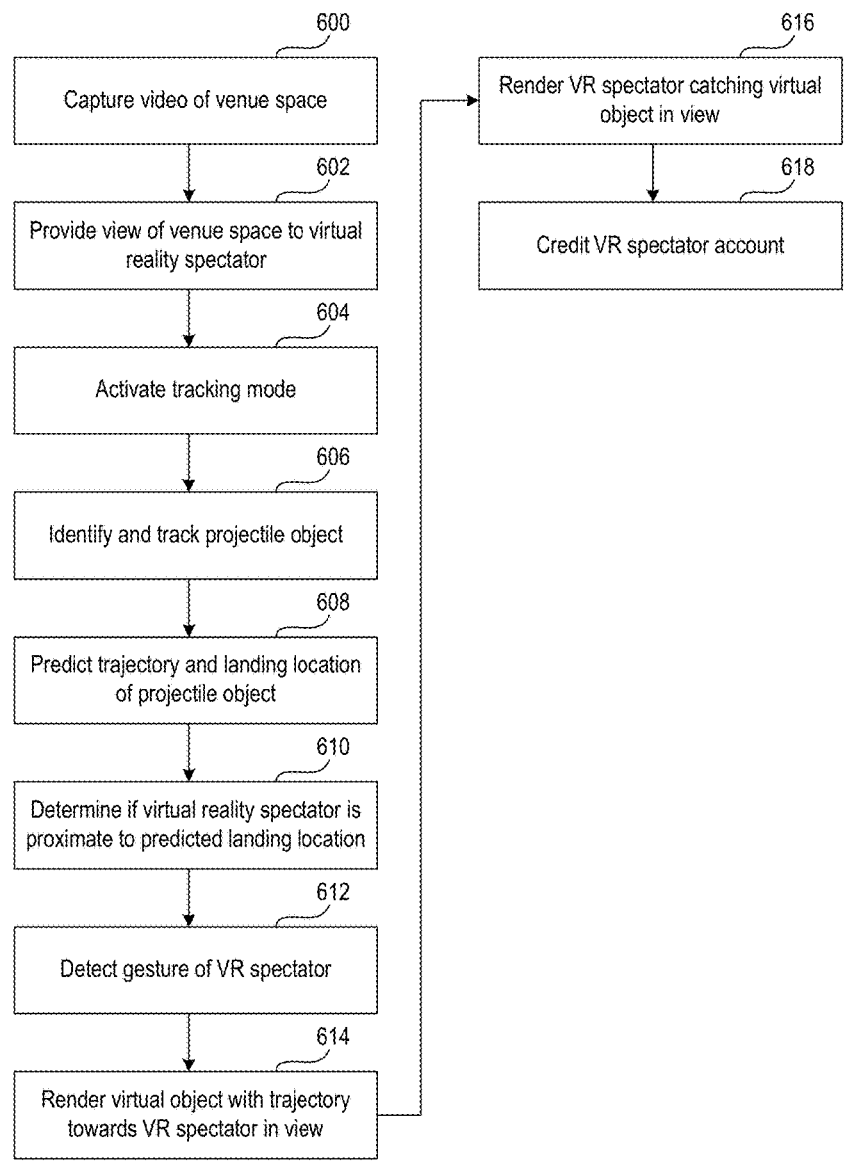
FIG. 6 illustrates a method for enabling a virtual reality spectator to participate in a launched giveaway in a venue, in accordance with implementations of the disclosure.

FIG. 6 illustrates a method for enabling a virtual reality spectator to participate in a launched giveaway in a venue, in accordance with implementations of the disclosure. At method operation 600, cameras in a venue space capture video of the venue space, generating a plurality of video feeds. At method operation 602, a view of the venue space is provided to a virtual reality spectator, for example, by assigning the virtual reality spectator to a location in the venue and stitching appropriate video feeds to generate video that provides the view. The video is rendered to an HMD worn by the virtual reality spectator.

At method operation 604, a tracking mode is activated to enable tracking of a projectile object in the video feeds from the cameras. At method operation 606, the projectile object is identified and tracked in the video feeds. At method operation 608, a trajectory and/or landing location of the projectile object are predicted. At method operation 610, it is determined whether the virtual reality spectator's location in the venue is proximate to the predicted trajectory or the predicted landing location of the projectile object. If the virtual reality spectator's location is proximate, then at method operation 612, a gesture of the virtual reality spectator is detected, such as the virtual reality spectator raising their hands to catch the projectile object. In response to detecting the gesture, then at method operation 614, a virtual object is rendered in the virtual reality spectator view having a trajectory that is towards the virtual reality spectator.

At method operation 616, the virtual reality spectator view is rendered to show the virtual reality spectator catching the virtual object. At method operation 618, an account of the virtual reality spectator is credited with an item based on catching the virtual object.

Figure 7A:
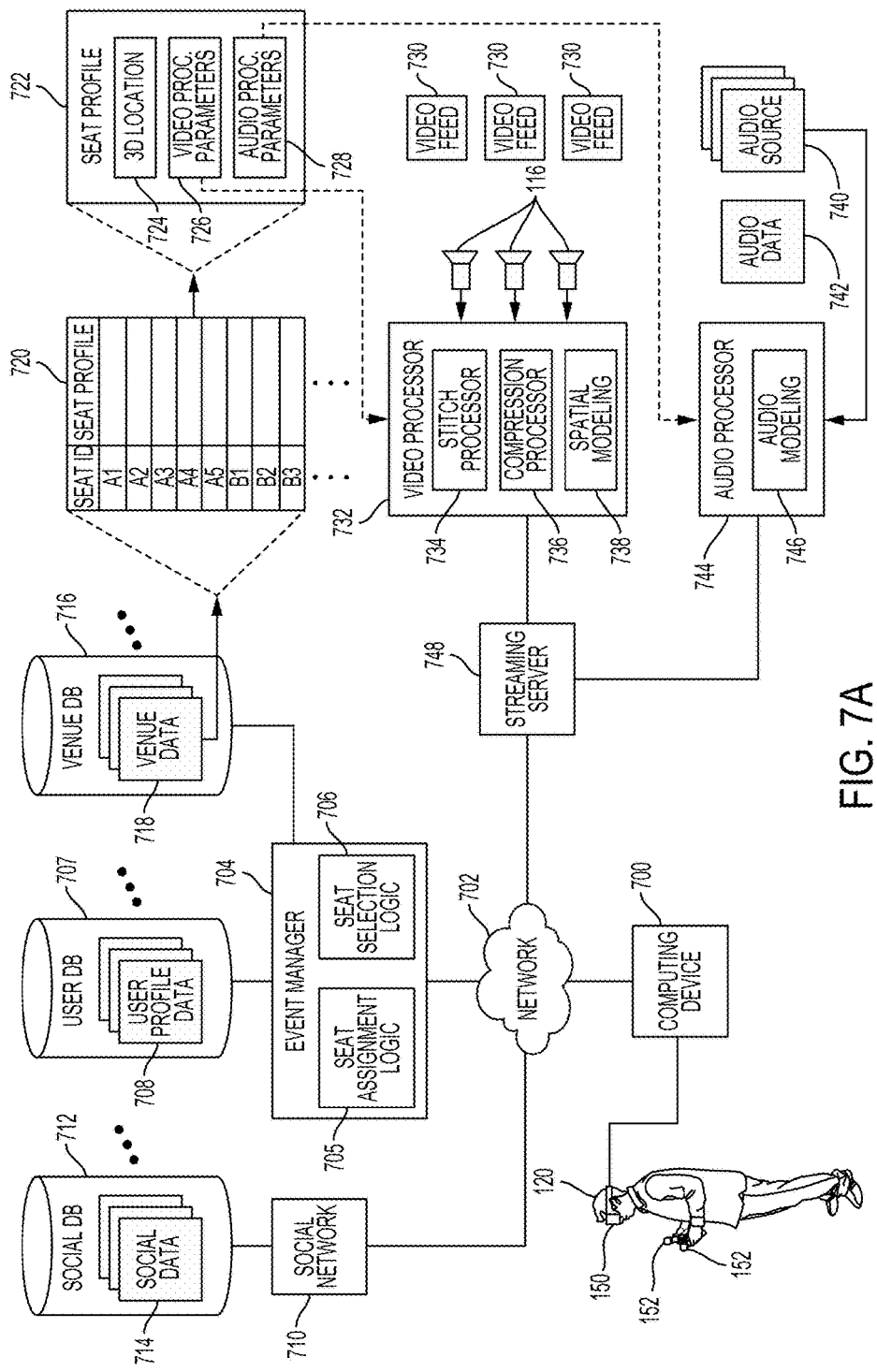
FIG. 7A conceptually illustrates a system for providing virtual reality spectating of an e-sports event, in accordance with implementations of the disclosure.

FIG. 7A conceptually illustrates a system for providing virtual reality spectating of an e-sports event, in accordance with implementations of the disclosure. Though not specifically described in detail for purposes of ease of description, it will be appreciated that the various systems, components, and modules described herein may be defined by one or more computers or servers having one or more processors for executing program instructions, as well as one or more memory devices for storing data and said program instructions. It should be appreciated that any of such systems, components, and modules may communicate with any other of such systems, components, and modules, and/or transmit/receive data, over one or more networks, as necessary, to facilitate the functionality of the implementations of the present disclosure. In various implementations, various portions of the systems, components, and modules may be local to each other or distributed over the one or more networks.

In the illustrated implementation, a virtual reality spectator 120 interfaces with systems through an HMD 150, and uses one or more controller devices 152 for additional interactivity and input. In some implementations, the video imagery displayed via the HMD to the virtual reality spectator 120 is received from a computing device 700, that communicates over a network 702 (which may include the Internet) to various systems and devices, as described herein.

In order to initiate access to spectate an e-sports event, the virtual reality spectator 120 may access an event manager 704, which handles requests to spectate an e-sports event. The event manager 704 can include seat assignment logic 705 configured to assign the virtual reality spectator 120 to a particular seat in the venue of the e-sports event. The seat assignment logic 705 can utilize various types of information to determine which seat to assign the virtual reality spectator 120, including based on user profile data 708 for the spectator that is stored to a user database 707. By way of example, such user profile data 708 can include demographic information about the user such as age, geo-location, gender, nationality, primary language, occupation, etc. and other types of information such as interests, preferences, games played/owned/purchased, game experience levels, Internet browsing history, etc.

In some implementations, the seat assignment logic 705 can also use information obtained from a social network 710 to, for example, assign spectators that are friends on the social network to seats that are proximate or next to each other. To obtain such information, the social network 710 may store social information about users (including social graph membership information) to a social database 712 as social data 714. In some implementations, the seat assignment logic 705 may access the social data (e.g. accessing a social graph of a given user/spectator) through an API of the social network 710.

In some implementations, the seat assignment logic 705 is configured to determine which seats are available, e.g. not occupied by real and/or virtual spectators, and assign a virtual reality spectator based at least in part on such information. In some implementations, the seat assignment logic 705 is configured to automatically assign a virtual reality spectator to the best available seat, as determined from a predefined ranking of the seats in the venue.

It will be appreciated that the seat assignment logic 705 can use any factor described herein in combination with any other factor(s) to determine which seat to assign a given virtual reality spectator. In some implementations, available seats are scored based on various factors, and the seat assignment is determined based on the score (e.g. virtual reality spectator is assigned to highest scoring seat). In some implementations, the seat assignment logic 705 presents a recommended seat for acceptance by the spectator 120, and the spectator 120 is assigned to the recommended seat upon the acceptance thereof.

In other implementations, the virtual reality spectator 120 may access an interface provided by a seat selection logic 706 that is configured to enable the virtual reality spectator to select a given seat from available seats.

A venue database 716 stores data about one or more venues as venue data 718. The venue data 718 can include any data describing the venue, such as a 3D space map, the locations of cameras, speakers, microphones, etc. The venue data 718 may further include a table 720 associating seat profiles to unique seat identifiers. In some implementations, each seat has its own seat profile. In some implementations, a group of seats (e.g. in close proximity to each other) may share the same seat profile. An example seat profile 722 includes information such as the 3D location 724 of the seat, video processing parameters 726, and audio processing parameters 728.

A video processor 732 includes a stitch processor 734 that may use the video processing parameters 726 and/or the 3D location 724 of the spectator's assigned seat to stitch together video feeds 730 from cameras 116, so as to generate a composite video that provides the view for the virtual reality spectator 120 in accordance with the virtual reality spectator's view direction. In some implementations, spatial modeling module 738 generates or accesses a spatial model of the 3D environment of the venue (e.g. including locations of cameras and the location of the spectator's seat) in order to facilitate stitching of the video feeds 730. The stitching of the video feeds may entail spatial projection of the video feeds to provide a perspective-correct video for the spectator. In some implementations, the resulting composite video is a 3D video, whereas in other implementations the composite video is a 2D video.

A compression processor 736 is configured to compress the raw composite video, employing video compression techniques known in the art, as well as foveated rendering, to reduce the amount of data required for streaming. The compressed video data is then streamed by the streaming server 748 over the network 702 to the computing device 700, which processes and/or renders the video to the HMD 150 for viewing by the virtual reality spectator 120.

In some implementations, the video feeds are transmitted from the cameras to one or more computing devices that are local to the cameras/venue which also perform the video processing. In some implementations, the cameras are directly connected to such computing devices. In some implementations, the video feeds are transmitted over a local network (e.g. including a local area network (LAN), Wi-Fi network, etc.) to such computing devices. In some implementations, the computing devices are remotely located, and the video feeds may be transmitted over one or more networks, such as the Internet, a LAN, a wide area network (WAN), etc.

An audio processor 744 is configured to process audio data 742 from audio sources 740 to be streamed with the compressed video data. The processing may use the audio processing parameters 728 and/or the 3D location 724 of the spectator's seat. In some implementations, an audio modeling module 746 applies an audio model based on the 3D space of the venue to process the audio data 742. Such an audio model may simulate the acoustics of the assigned seat in the venue so that audio is rendered to the virtual reality spectator in a realistic fashion. By way of example without limitation, sounds from other virtual reality spectators may be processed to simulate not only directionality relative to the seat location of the virtual reality spectator 120, but also with appropriate acoustics (such as delay, reverb, etc.) for the seat location in the venue. As noted, audio sources can include gameplay audio, commentator(s), house music, audio from microphones in the venue, etc.

Figure 7B:
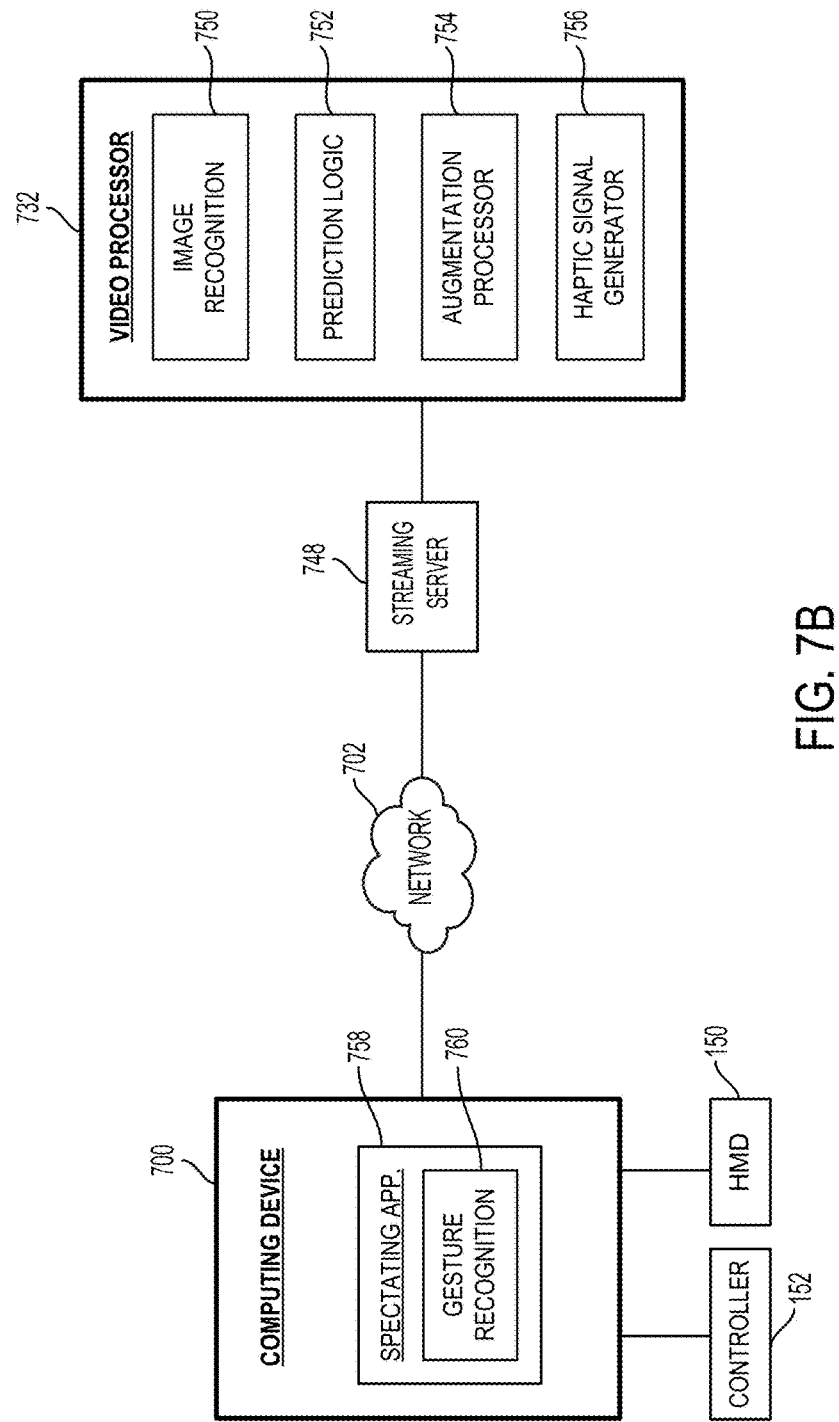
FIG. 7B illustrates additional componentry and functionality of the system in accordance with the implementation of FIG. 7A, in accordance with implementations of the disclosure.

FIG. 7B illustrates additional componentry and functionality of the system in accordance with the implementation of FIG. 7A, in accordance with implementations of the disclosure. As shown, the video processor 732 further includes an image recognition module 750 that is configured to analyze the video feeds from the cameras to identify and track a projectile object 202 in the video feeds. Prediction logic 752 is configured to predict the trajectory and/or landing location of the projectile object 202. An augmentation processor 754 is configured to augment the video for the spectator with a virtual object 210 that is rendered so as to show the virtual object 210 having a trajectory towards the virtual reality spectator 120.

In some implementations, the rendering of the virtual object 210 is processed (e.g. as an overlay) onto a video feed. In some implementations, the rendering of the virtual object 210 is processed (e.g. as an overlay) onto stitched video that has been stitched by the stitch processor 734. In some implementations, lighting in the venue 100 can be modeled (e.g. locations, intensities, colors of light sources) to enable more realistic rendering of the shading and appearance of the virtual object 210. As noted previously, the video for the virtual reality spectator including the virtual object 210 may be compressed prior to being streamed by the streaming server 748 over the network 702 to the computing device 700.

In some implementations, the computing device 700 executes a spectating application 758 that provides for the interactive virtual reality spectator experience described herein via the HMD 150. That is, the spectating application 758, when executed by the computing device 700, enables access to the event online for virtual reality spectating, and also provides for rendering of video to the HMD 150 that provides the view of the venue space, and processes input received from the virtual reality spectator 120, for example via the controller device 152. In some implementations, the spectating application 758 further defines a gesture recognition module 760 that is configured to detect/recognize a predefined gesture that indicates the virtual reality spectator's desire to catch the projectile object 202, such as raising one or both hands prior to or during launch or during the flight of the projectile object 202. In response to detecting such a gesture, the spectating application may send a signal over the network to the streaming server indicating as such. The streaming server 748 may then trigger the modification of the spectator video by the video processor 732 to include the virtual object 210 as has been described.

Additionally, a haptic signal generator 756 is configured to generate a signal transmitted to the computing device 700 to produce haptic feedback, e.g. via the controller 152. In some implementations, the haptic signal generator 756 generates the haptic feedback signal to coincide with rendering of spectator video that shows the virtual object 210 being caught by a virtual hand of the virtual reality spectator 120.

Figure 8:
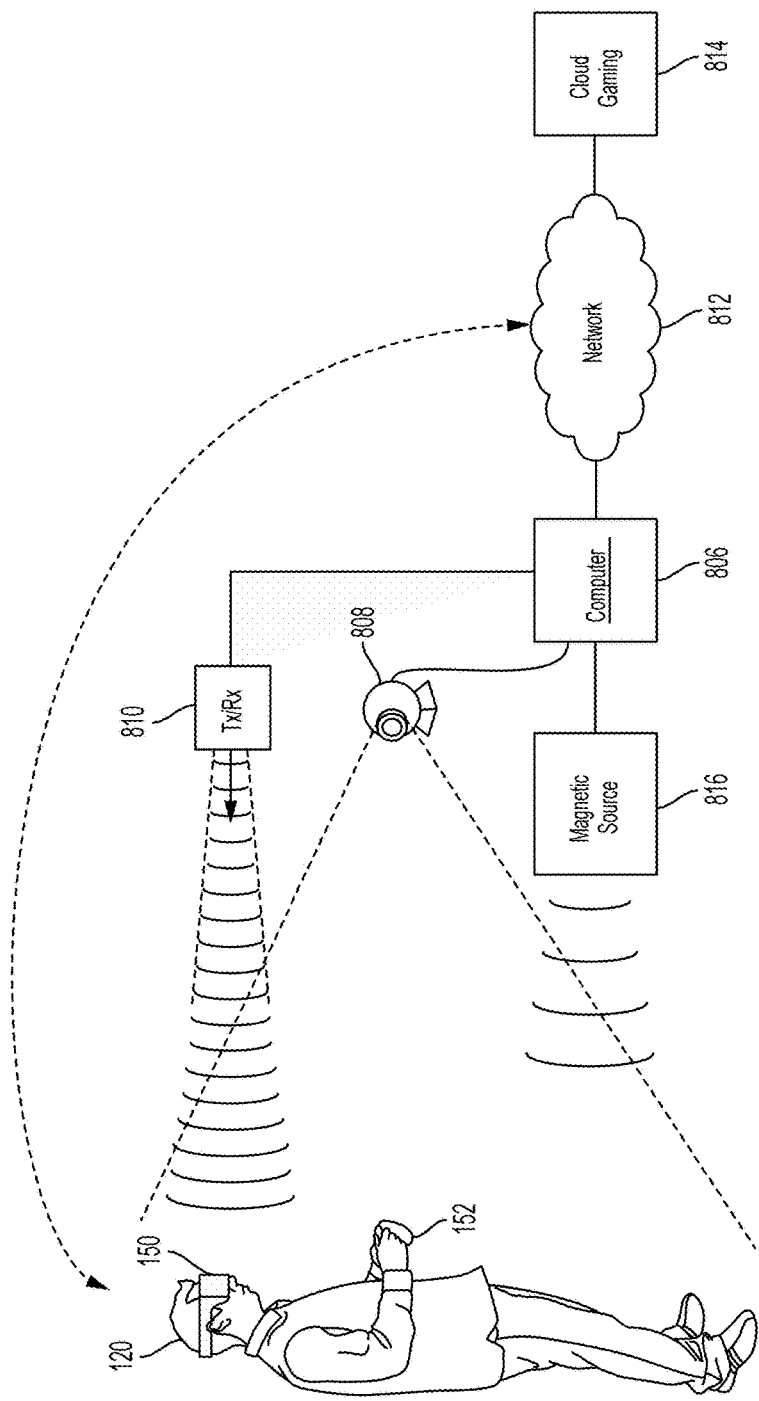
FIG. 8 illustrates a system for interaction with a virtual environment via a head-mounted display (HMD), in accordance with an implementation of the disclosure.

FIG. 8 illustrates a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD. In the illustrated implementation, a user 120 is shown wearing a head-mounted display (HMD) 150. The HMD 150 is worn in a manner similar to glasses, goggles, or a helmet, and is configured to display a video game or other content to the user 120. The HMD 150 provides a very immersive experience to the user by virtue of its provision of display mechanisms in close proximity to the user's eyes. Thus, the HMD 150 can provide display regions to each of the user's eyes which occupy large portions or even the entirety of the field of view of the user, and may also provide viewing with three-dimensional depth and perspective.

In the illustrated implementation, the HMD 150 is wirelessly connected to a computer 806. In other implementations, the HMD 150 is connected to the computer 806 through a wired connection. The computer 806 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 150. In some implementations, the computer 806 is configured to execute any other type of interactive application that provides a virtual space/environment that can be viewed through an HMD. A transceiver 810 is configured to transmit (by wired connection or wireless connection) the video and audio from the video game to the HMD 150 for rendering thereon. The transceiver 810 includes a transmitter for transmission of data to the HMD 150, as well as a receiver for receiving data that is transmitted by the HMD 150.

In some implementations, the HMD 150 may also communicate with the computer through alternative mechanisms or channels, such as via a network 812 to which both the HMD 150 and the computer 106 are connected.

The user 120 may operate an interface object 152 to provide input for the video game. Additionally, a camera 808 can be configured to capture images of the interactive environment in which the user 120 is located. These captured images can be analyzed to determine the location and movements of the user 120, the HMD 150, and the interface object 152. In various implementations, the interface object 152 includes a light which can be tracked, and/or inertial sensor(s), to enable determination of the interface object's location and orientation and tracking of movements.

In some implementations, a magnetic source 816 is provided that emits a magnetic field to enable magnetic tracking of the HMD 150 and interface object 152. Magnetic sensors in the HMD 150 and the interface object 152 can be configured to detect the magnetic field (e.g. strength, orientation), and this information can be used to determine and track the location and/or orientation of the HMD 150 and the interface object 152.

In some implementations, the interface object 152 is tracked relative to the HMD 150. For example, the HMD 150 may include an externally facing camera that captures images including the interface object 152. The captured images can be analyzed to determine the location/orientation of the interface object 152 relative to the HMD 150, and using a known location/orientation of the HMD, so determine the location/orientation of the interface object 152 in the local environment.

The way the user interfaces with the virtual reality scene displayed in the HMD 150 can vary, and other interface devices in addition to interface object 152, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 150.

Additionally, the HMD 150 may include one or more lights which can be tracked to determine the location and orientation of the HMD 150. The camera 808 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 808 can be defined to include multiple image capture devices (e.g. stereoscopic pair of cameras), an IR camera, a depth camera, and combinations thereof.

In some implementations, the computer 806 functions as a thin client in communication over a network 812 with a cloud application (e.g. gaming, streaming, spectating, etc.) provider 814. In such an implementation, generally speaking, the cloud application provider 114 maintains and executes the video game being played by the user 150. The computer 806 transmits inputs from the HMD 150, the interface object 152 and the camera 808, to the cloud application provider, which processes the inputs to affect the game state of the executing video game. The output from the executing video game, such as video data, audio data, and haptic feedback data, is transmitted to the computer 806. The computer 806 may further process the data before transmission or may directly transmit the data to the relevant devices. For example, video and audio streams are provided to the HMD 150, whereas a haptic/vibration feedback command is provided to the interface object 152.

In some implementations, the HMD 150, interface object 152, and camera 808, may themselves be networked devices that connect to the network 812, for example to communicate with the cloud application provider 814. In some implementations, the computer 106 may be a local network device, such as a router, that does not otherwise perform video game processing, but which facilitates passage of network traffic. The connections to the network by the HMD 150, interface object 152, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figures 1, 9A:
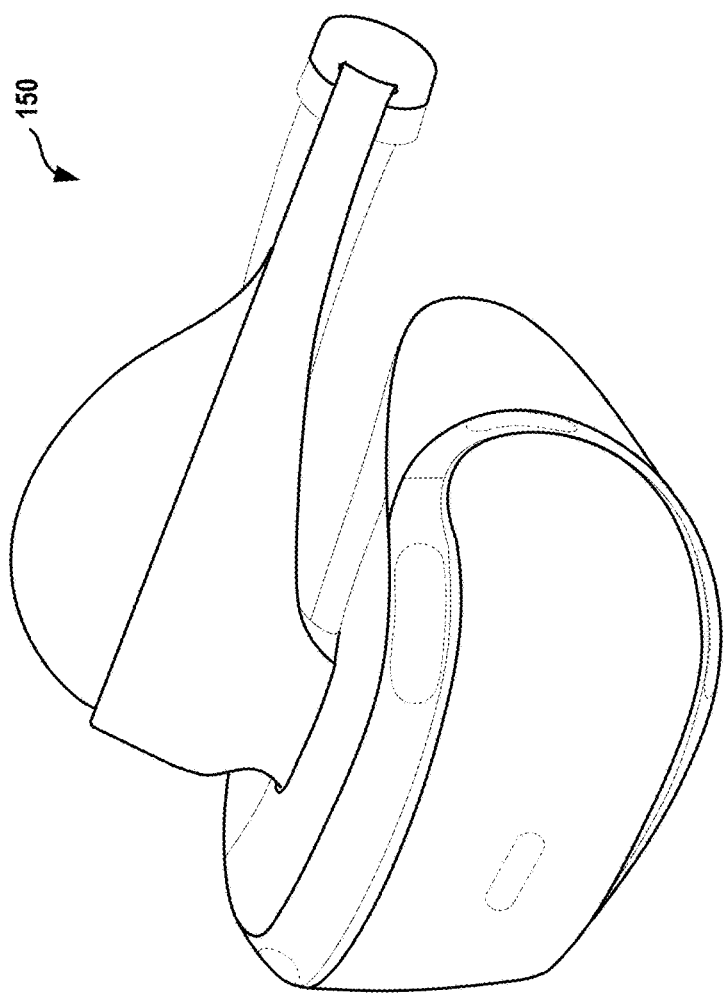
Figures 2, 9A:
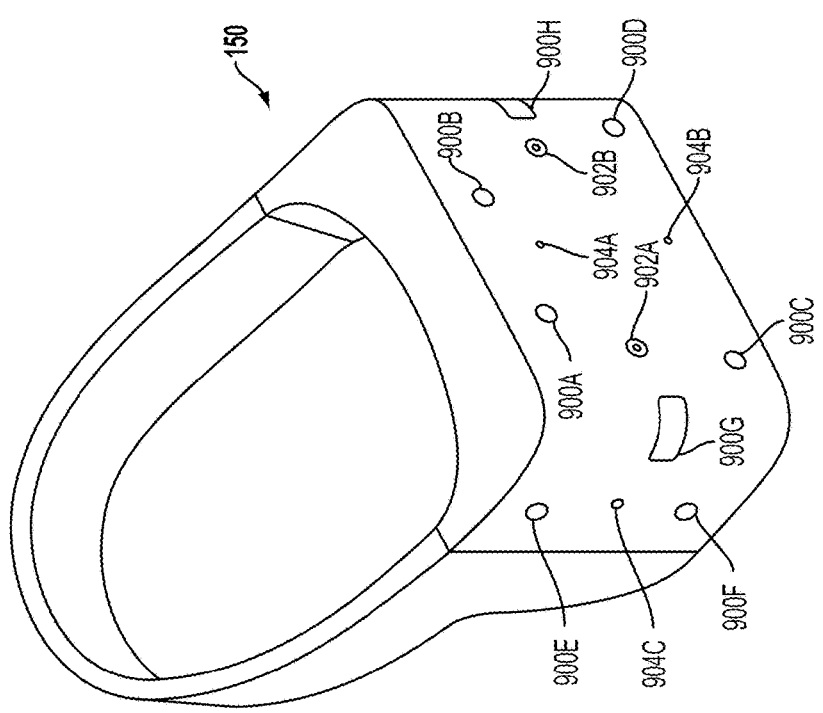

FIGS. 9A-1 and 9A-2 illustrate a head-mounted display (HMD), in accordance with an implementation of the disclosure. FIG. 9A-1 in particular illustrates the Playstation® VR headset, which is one example of a HMD in accordance with implementations of the disclosure. As shown, the HMD 150 includes a plurality of lights 900A-H. Each of these lights may be configured to have specific shapes, and can be configured to have the same or different colors. The lights 900A, 900B, 900C, and 900D are arranged on the front surface of the HMD 150. The lights 900E and 900F are arranged on a side surface of the HMD 150. And the lights 900G and 900H are arranged at corners of the HMD 150, so as to span the front surface and a side surface of the HMD 150. It will be appreciated that the lights can be identified in captured images of an interactive environment in which a user uses the HMD 150. Based on identification and tracking of the lights, the location and orientation of the HMD 150 in the interactive environment can be determined. It will further be appreciated that some of the lights may or may not be visible depending upon the particular orientation of the HMD 150 relative to an image capture device. Also, different portions of lights (e.g. lights 900G and 900H) may be exposed for image capture depending upon the orientation of the HMD 150 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 150. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 150 and understand that the user is actively engaged in intense gameplay, and may not wish to be disturbed at that moment.

The HMD 150 may additionally include one or more microphones. In the illustrated implementation, the HMD 150 includes microphones 904A and 904B defined on the front surface of the HMD 150, and microphone 904C defined on a side surface of the HMD 150. By utilizing an array of microphones, sound from each of the microphones can be processed to determine the location of the sound's source. This information can be utilized in various ways, including exclusion of unwanted sound sources, association of a sound source with a visual identification, etc.

The HMD 150 may also include one or more image capture devices. In the illustrated implementation, the HMD 150 is shown to include image capture devices 902A and 902B. By utilizing a stereoscopic pair of image capture devices, three-dimensional (3D) images and video of the environment can be captured from the perspective of the HMD 150. Such video can be presented to the user to provide the user with a "video see-through" ability while wearing the HMD 150. That is, though the user cannot see through the HMD 150 in a strict sense, the video captured by the image capture devices 902A and 902B (e.g., or one or more external facing (e.g. front facing) cameras disposed on the outside body of the HMD 150) can nonetheless provide a functional equivalent of being able to see the environment external to the HMD 150 as if looking through the HMD 150. Such video can be augmented with virtual elements to provide an augmented reality experience, or may be combined or blended with virtual elements in other ways. Though in the illustrated implementation, two cameras are shown on the front surface of the HMD 150, it will be appreciated that there may be any number of externally facing cameras installed on the HMD 150, oriented in any direction. For example, in another implementation, there may be cameras mounted on the sides of the HMD 150 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

Figure 9B:
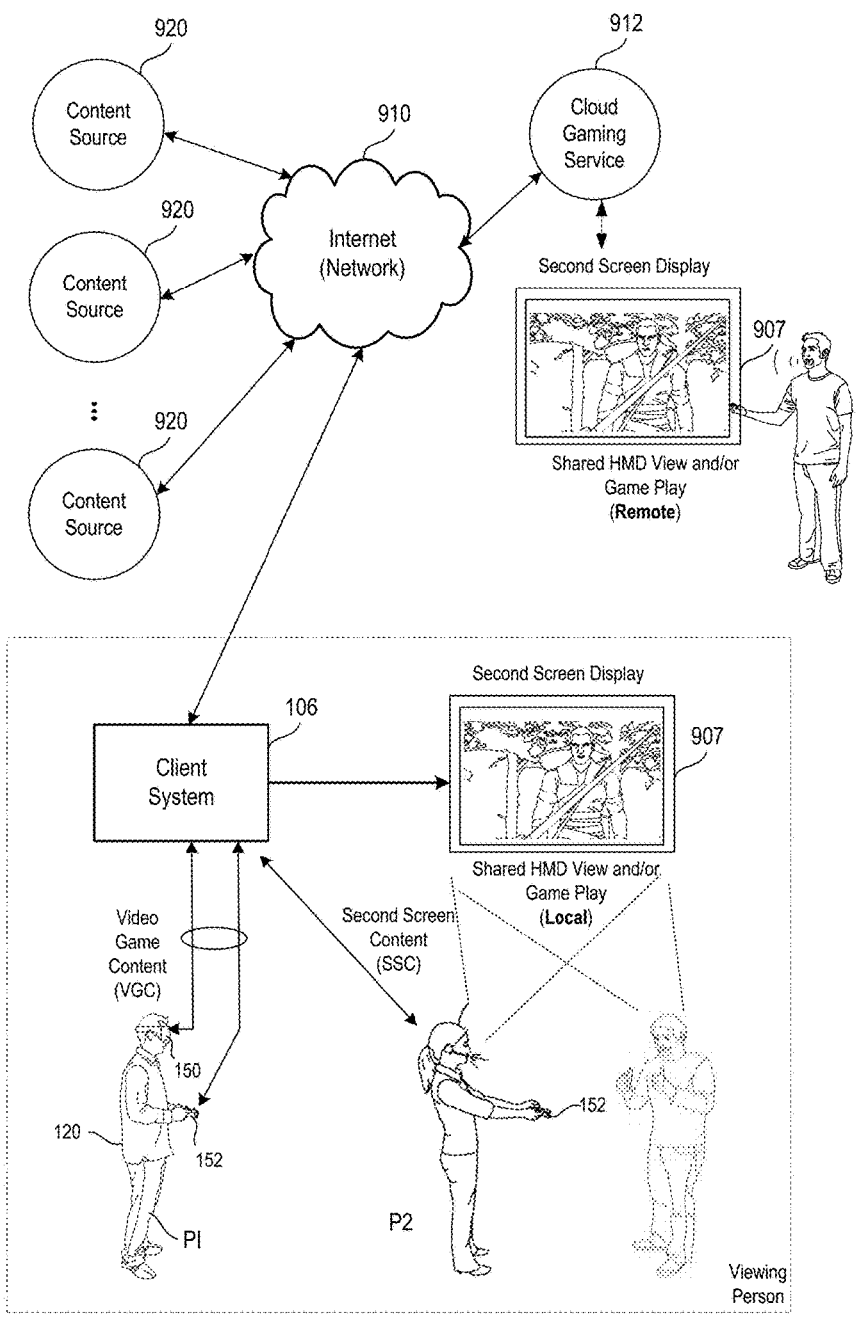
FIG. 9B illustrates one example of an HMD user interfacing with a client system, and the client system providing content to a second screen display, which is referred to as a second screen, in accordance with one implementation.

FIG. 9B illustrates one example of an HMD 150 user 120 interfacing with a client system 806, and the client system 806 providing content to a second screen display, which is referred to as a second screen 907. The client system 806 may include integrated electronics for processing the sharing of content from the HMD 150 to the second screen 907. Other implementations may include a separate device, module, connector, that will interface between the client system and each of the HMD 150 and the second screen 907. In this general example, user 120 is wearing HMD 150 and is playing a video game using a controller, which may also be interface object 104. The interactive play by user 120 will produce video game content (VGC), which is displayed interactively to the HMD 150.

In one implementation, the content being displayed in the HMD 150 is shared to the second screen 907. In one example, a person viewing the second screen 907 can view the content being played interactively in the HMD 150 by user 120. In another implementation, another user (e.g. player 2) can interact with the client system 806 to produce second screen content (SSC). The second screen content produced by a player also interacting with the controller 104 (or any type of user interface, gesture, voice, or input), may be produced as SSC to the client system 806, which can be displayed on second screen 907 along with the VGC received from the HMD 150.

Accordingly, the interactivity by other users who may be co-located or remote from an HMD user can be social, interactive, and more immersive to both the HMD user and users that may be viewing the content played by the HMD user on a second screen 907. As illustrated, the client system 806 can be connected to the Internet 910. The Internet can also provide access to the client system 806 to content from various content sources 920. The content sources 920 can include any type of content that is accessible over the Internet.

Such content, without limitation, can include video content, movie content, streaming content, social media content, news content, friend content, advertisement content, etc. In one implementation, the client system 806 can be used to simultaneously process content for an HMD user, such that the HMD is provided with multimedia content associated with the interactivity during gameplay. The client system 806 can then also provide other content, which may be unrelated to the video game content to the second screen. The client system 806 can, in one implementation receive the second screen content from one of the content sources 920, or from a local user, or a remote user.

Figure 10:
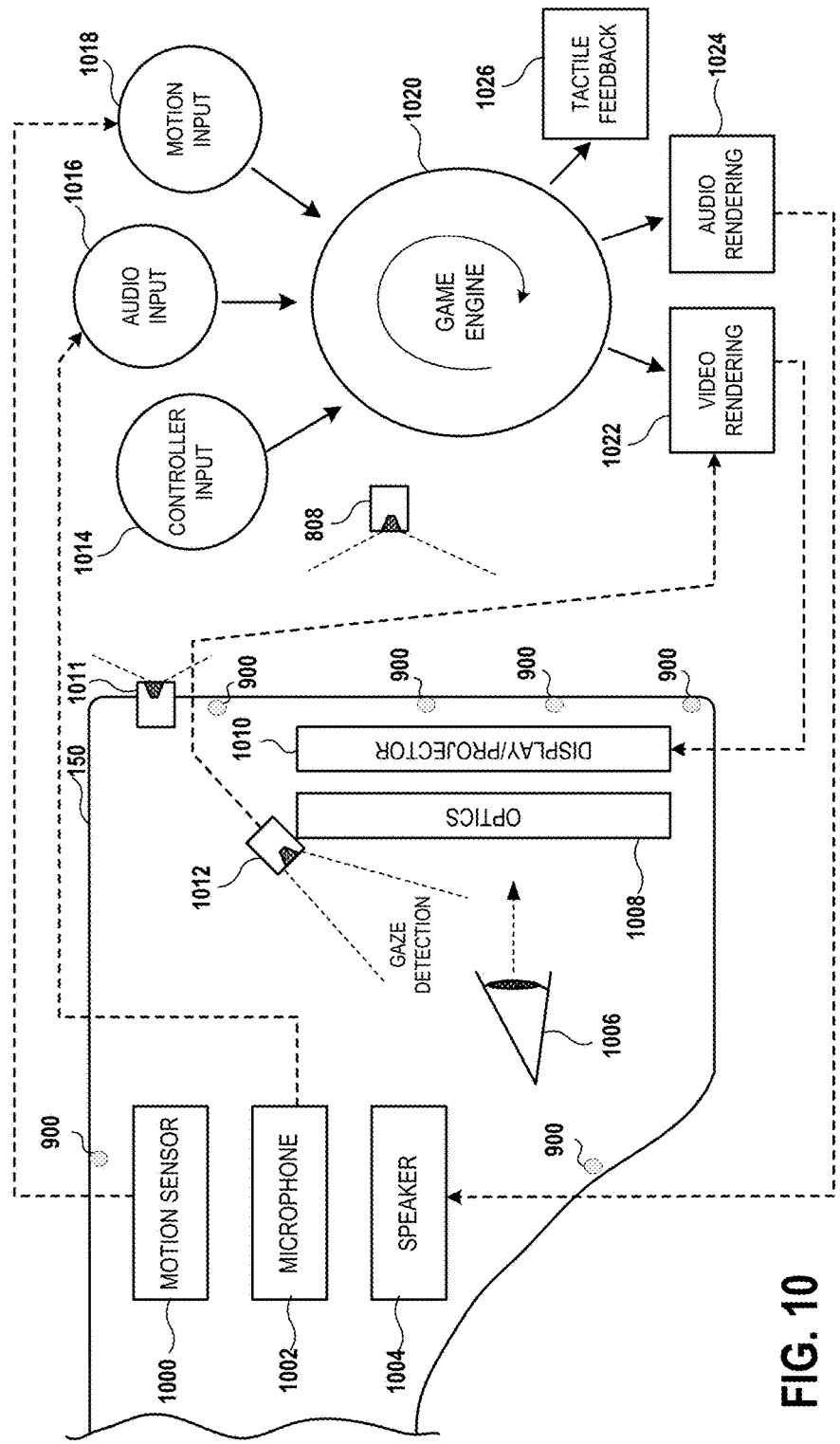
FIG. 10 conceptually illustrates the function of an HMD in conjunction with an executing video game, in accordance with an implementation of the disclosure.

FIG. 10 conceptually illustrates the function of the HMD 150 in conjunction with an executing video game or other application, in accordance with an implementation of the disclosure. The executing video game/application is defined by a game/application engine 1020 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 1014, audio input 1016 and motion input 1018. The controller input 1014 may be defined from the operation of a gaming controller separate from the HMD 150, such as a handheld gaming controller (e.g. Sony DUALSHOCK®4 wireless controller, Sony PlayStation®Move motion controller) or interface object 152. By way of example, controller input 1014 may include directional inputs, button presses, trigger activation, movements, gestures, or other kinds of inputs processed from the operation of a gaming controller. In some implementations, the movements of a gaming controller are tracked through an externally facing camera 1011 of the HMD 102, which provides the location/orientation of the gaming controller relative to the HMD 102. The audio input 1016 can be processed from a microphone 1002 of the HMD 150, or from a microphone included in the image capture device 808 or elsewhere in the local environment. The motion input 1018 can be processed from a motion sensor 1000 included in the HMD 150, or from image capture device 808 as it captures images of the HMD 150. The game engine 1020 receives inputs which are processed according to the configuration of the game engine to update the game state of the video game. The game engine 1020 outputs game state data to various rendering modules which process the game state data to define content which will be presented to the user.

In the illustrated implementation, a video rendering module 1022 is defined to render a video stream for presentation on the HMD 150. The video stream may be presented by a display/projector mechanism 1010, and viewed through optics 1008 by the eye 1006 of the user. An audio rendering module 1004 is configured to render an audio stream for listening by the user. In one implementation, the audio stream is output through a speaker 1004 associated with the HMD 150. It should be appreciated that speaker 1004 may take the form of an open air speaker, headphones, or any other kind of speaker capable of presenting audio.

In one implementation, a gaze tracking camera 1012 is included in the HMD 150 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 1012, when considered alone, provides for a gaze direction of the user relative to the HMD 150. However, when considered in combination with the tracked location and orientation of the HMD 150, a real-world gaze direction of the user can be determined, as the location and orientation of the HMD 150 is synonymous with the location and orientation of the user's head. That is, the real-world gaze direction of the user can be determined from tracking the positional movements of the user's eyes and tracking the location and orientation of the HMD 150. When a view of a virtual environment is rendered on the HMD 150, the real-world gaze direction of the user can be applied to determine a virtual world gaze direction of the user in the virtual environment.

Additionally, a tactile feedback module 1026 is configured to provide signals to tactile feedback hardware included in either the HMD 150 or another device operated by the user, such as interface object 152. The tactile feedback may take the form of various kinds of tactile sensations, such as vibration feedback, temperature feedback, pressure feedback, etc. The interface object 152 can include corresponding hardware for rendering such forms of tactile feedback.

Figure 11:
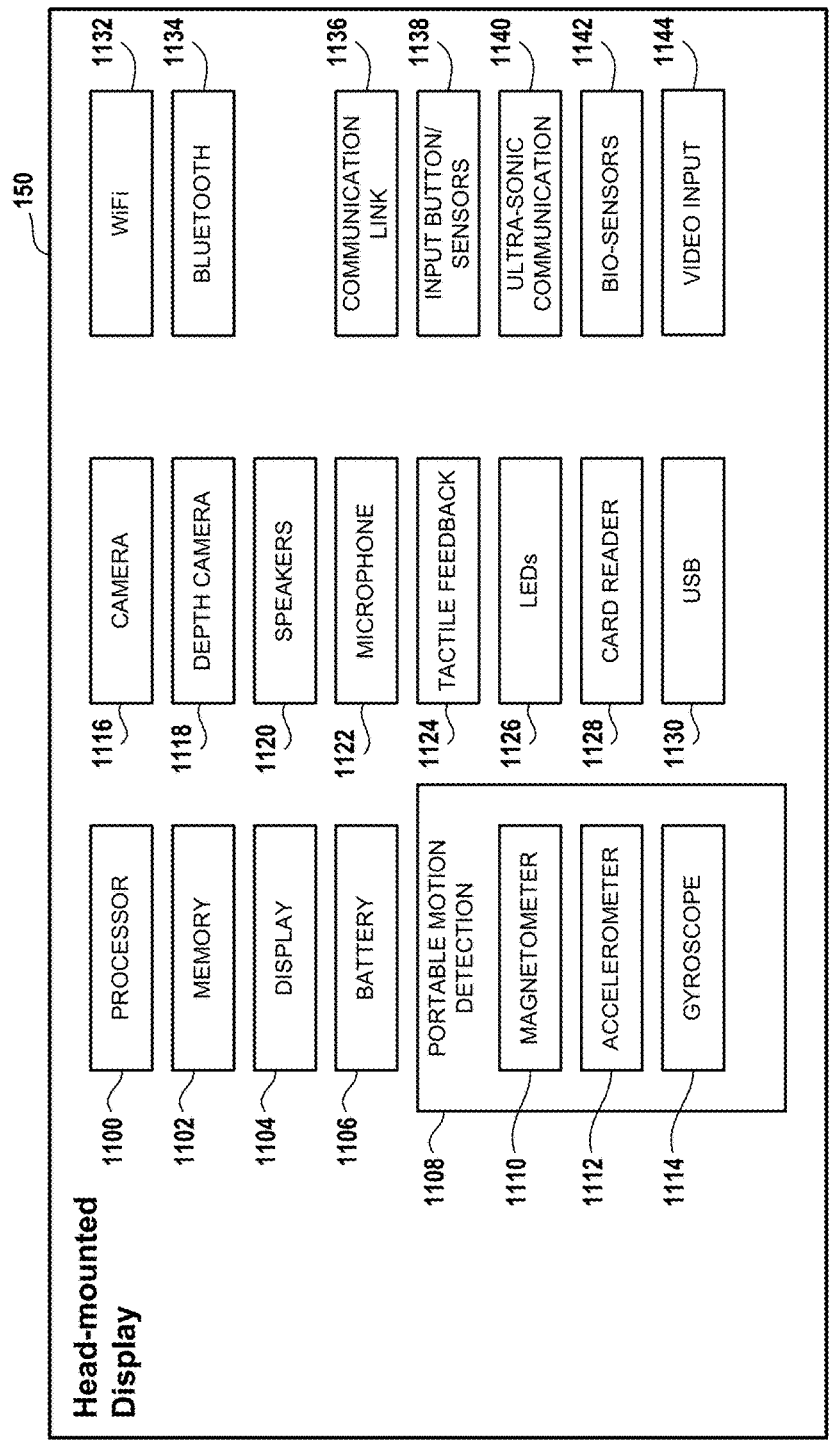
FIG. 11 illustrates components of a head-mounted display, in accordance with an implementation of the disclosure.

With reference to FIG. 11, a diagram illustrating components of a head-mounted display 150 is shown, in accordance with an implementation of the disclosure. The head-mounted display 150 includes a processor 1100 for executing program instructions. A memory 1102 is provided for storage purposes, and may include both volatile and non-volatile memory. A display 1104 is included which provides a visual interface that a user may view. A battery 1106 is provided as a power source for the head-mounted display 150. A motion detection module 1108 may include any of various kinds of motion sensitive hardware, such as a magnetometer 1110, an accelerometer 1112, and a gyroscope 1114.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1112 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1110 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1112 is used together with magnetometer 1110 to obtain the inclination and azimuth of the head-mounted display 150.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1114 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1116 is provided for capturing images and image streams of a real environment. More than one camera may be included in the head-mounted display 150, including a camera that is rear-facing (directed away from a user when the user is viewing the display of the head-mounted display 150), and a camera that is front-facing (directed towards the user when the user is viewing the display of the head-mounted display 150). Additionally, a depth camera 1118 may be included in the head-mounted display 150 for sensing depth information of objects in a real environment.

The head-mounted display 150 includes speakers 1120 for providing audio output. Also, a microphone 1122 may be included for capturing audio from the real environment, including sounds from the ambient environment, speech made by the user, etc. The head-mounted display 150 includes tactile feedback module 1124 for providing tactile feedback to the user. In one implementation, the tactile feedback module 1124 is capable of causing movement and/or vibration of the head-mounted display 150 so as to provide tactile feedback to the user.

LEDs 1126 are provided as visual indicators of statuses of the head-mounted display 150. For example, an LED may indicate battery level, power on, etc. A card reader 1128 is provided to enable the head-mounted display 150 to read and write information to and from a memory card. A USB interface 1130 is included as one example of an interface for enabling connection of peripheral devices, or connection to other devices, such as other portable devices, computers, etc. In various implementations of the head-mounted display 150, any of various kinds of interfaces may be included to enable greater connectivity of the head-mounted display 150.

A Wi-Fi module 1132 is included for enabling connection to the Internet or a local area network via wireless networking technologies. Also, the head-mounted display 150 includes a Bluetooth module 1134 for enabling wireless connection to other devices. A communications link 1136 may also be included for connection to other devices. In one implementation, the communications link 1136 utilizes infrared transmission for wireless communication. In other implementations, the communications link 1136 may utilize any of various wireless or wired transmission protocols for communication with other devices.

Input buttons/sensors 1138 are included to provide an input interface for the user. Any of various kinds of input interfaces may be included, such as buttons, touchpad, joystick, trackball, etc. An ultra-sonic communication module 1140 may be included in head-mounted display 150 for facilitating communication with other devices via ultra-sonic technologies.

Bio-sensors 1142 are included to enable detection of physiological data from a user. In one implementation, the bio-sensors 1142 include one or more dry electrodes for detecting bio-electric signals of the user through the user's skin.

A video input 1144 is configured to receive a video signal from a primary processing computer (e.g. main game console) for rendering on the HMD. In some implementations, the video input is an HDMI input.

The foregoing components of head-mounted display 150 have been described as merely exemplary components that may be included in head-mounted display 150. In various implementations of the disclosure, the head-mounted display 150 may or may not include some of the various aforementioned components. Implementations of the head-mounted display 150 may additionally include other components not presently described, but known in the art, for purposes of facilitating aspects of the present disclosure as herein described.

Figure 12:
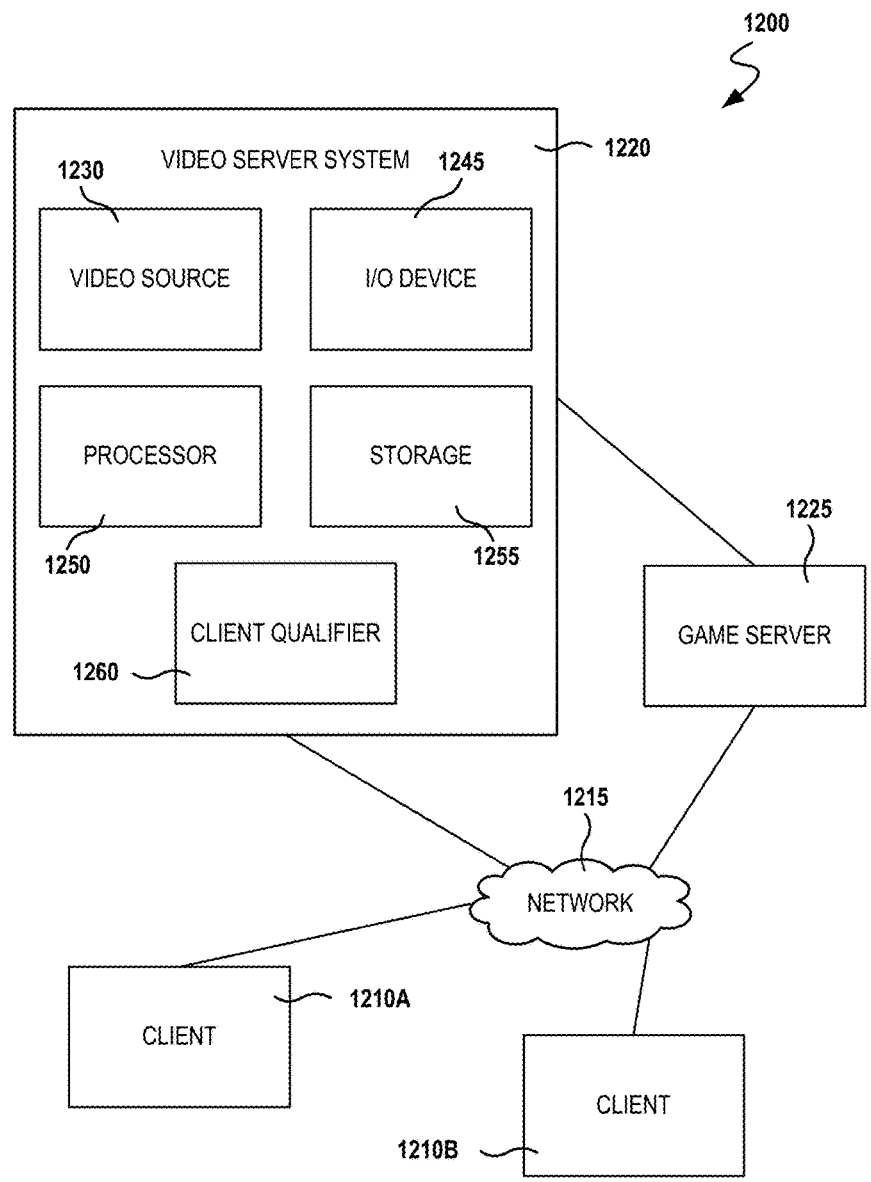
FIG. 12 is a block diagram of a Game System 1200, according to various implementations of the disclosure.

FIG. 12 is a block diagram of a Game System 1200, according to various implementations of the disclosure. Game System 1200 is configured to provide a video stream to one or more Clients 1210 via a Network 1215. Game System 1200 typically includes a Video Server System 1220 and an optional game server 1225. Video Server System 1220 is configured to provide the video stream to the one or more Clients 1210 with a minimal quality of service. For example, Video Server System 1220 may receive a game command that changes the state of or a point of view within a video game, and provide Clients 1210 with an updated video stream reflecting this change in state with minimal lag time. The Video Server System 1220 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1210, referred to herein individually as 1210A, 1210B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1210 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1210 or on a separate device such as a monitor or television. Clients 1210 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1210 are optionally geographically dispersed. The number of clients included in Game System 1200 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1220 to deliver a game viewed through the HMD. In one implementation, the game console receives the video stream from the video server system 1220, and the game console forwards the video stream, or updates to the video stream, to the HMD for rendering.

Clients 1210 are configured to receive video streams via Network 1215. Network 1215 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1210 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1210 may, but are not required to, further include systems configured for modifying received video. For example, a Client may be configured to perform further rendering, to overlay one video image on another video image, to crop a video image, and/or the like. For example, Clients 1210 may be configured to receive various types of video frames, such as I-frames, P-frames and B-frames, and to process these frames into images for display to a user. In some implementations, a member of Clients 1210 is configured to perform further rendering, shading, conversion to 3-D, or like operations on the video stream. A member of Clients 1210 is optionally configured to receive more than one audio or video stream. Input devices of Clients 1210 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1210 is generated and provided by Video Server System 1220. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1210 are typically configured to receive inputs from a user. These inputs may include game commands configured to change the state of the video game or otherwise affect game play. The game commands can be received using input devices and/or may be automatically generated by computing instructions executing on Clients 1210. The received game commands are communicated from Clients 1210 via Network 1215 to Video Server System 1220 and/or Game Server 1225. For example, in some implementations, the game commands are communicated to Game Server 1225 via Video Server System 1220. In some implementations, separate copies of the game commands are communicated from Clients 1210 to Game Server 1225 and Video Server System 1220. The communication of game commands is optionally dependent on the identity of the command Game commands are optionally communicated from Client 1210A through a different route or communication channel that that used to provide audio or video streams to Client 1210A.

Game Server 1225 is optionally operated by a different entity than Video Server System 1220. For example, Game Server 1225 may be operated by the publisher of a multi-player game. In this example, Video Server System 1220 is optionally viewed as a client by Game Server 1225 and optionally configured to appear from the point of view of Game Server 1225 to be a prior art client executing a prior art game engine. Communication between Video Server System 1220 and Game Server 1225 optionally occurs via Network 1215. As such, Game Server 1225 can be a prior art multiplayer game server that sends game state information to multiple clients, one of which is game server system 1220. Video Server System 1220 may be configured to communicate with multiple instances of Game Server 1225 at the same time. For example, Video Server System 1220 can be configured to provide a plurality of different video games to different users. Each of these different video games may be supported by a different Game Server 1225 and/or published by different entities. In some implementations, several geographically distributed instances of Video Server System 1220 are configured to provide game video to a plurality of different users. Each of these instances of Video Server System 1220 may be in communication with the same instance of Game Server 1225. Communication between Video Server System 1220 and one or more Game Server 1225 optionally occurs via a dedicated communication channel For example, Video Server System 1220 may be connected to Game Server 1225 via a high bandwidth channel that is dedicated to communication between these two systems.

Video Server System 1220 comprises at least a Video Source 1230, an I/O Device 1245, a Processor 1250, and non-transitory Storage 1255. Video Server System 1220 may include one computing device or be distributed among a plurality of computing devices. These computing devices are optionally connected via a communications system such as a local area network.

Video Source 1230 is configured to provide a video stream, e.g., streaming video or a series of video frames that form a moving picture. In some implementations, Video Source 1230 includes a video game engine and rendering logic. The video game engine is configured to receive game commands from a player and to maintain a copy of the state of the video game based on the received commands This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1225. Game Server 1225 may maintain a copy of the state of the game based on game commands received from multiple players using geographically disperse clients. In these cases, the game state is provided by Game Server 1225 to Video Source 1230, wherein a copy of the game state is stored and rendering is performed. Game Server 1225 may receive game commands directly from Clients 1210 via Network 1215, and/or may receive game commands via Video Server System 1220.

Video Source 1230 typically includes rendering logic, e.g., hardware, firmware, and/or software stored on a computer readable medium such as Storage 1255. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1210. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720 p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1230 includes a video recording device such as a camera. This camera may be used to generate delayed or live video that can be included in the video stream of a computer game. The resulting video stream optionally includes both rendered images and images recorded using a still or video camera. Video Source 1230 may also include storage devices configured to store previously recorded video to be included in a video stream. Video Source 1230 may also include motion or positioning sensing devices configured to detect motion or position of an object, e.g., person, and logic configured to determine a game state or produce video-based on the detected motion and/or position.

Video Source 1230 is optionally configured to provide overlays configured to be placed on other video. For example, these overlays may include a command interface, log in instructions, messages to a game player, images of other game players, video feeds of other game players (e.g., webcam video). In implementations of Client 1210A including a touch screen interface or a gaze detection interface, the overlay may include a virtual keyboard, joystick, touch pad, and/or the like. In one example of an overlay a player's voice is overlaid on an audio stream. Video Source 1230 optionally further includes one or more audio sources.

In implementations wherein Video Server System 1220 is configured to maintain the game state based on input from more than one player, each player may have a different point of view comprising a position and direction of view. Video Source 1230 is optionally configured to provide a separate video stream for each player based on their point of view. Further, Video Source 1230 may be configured to provide a different frame size, frame data size, and/or encoding to each of Client 1210. Video Source 1230 is optionally configured to provide 3-D video.

I/O Device 1245 is configured for Video Server System 1220 to send and/or receive information such as video, commands, requests for information, a game state, gaze information, device motion, device location, user motion, client identities, player identities, game commands, security information, audio, and/or the like. I/O Device 1245 typically includes communication hardware such as a network card or modem. I/O Device 1245 is configured to communicate with Game Server 1225, Network 1215, and/or Clients 1210.

Processor 1250 is configured to execute logic, e.g. software, included within the various components of Video Server System 1220 discussed herein. For example, Processor 1250 may be programmed with software instructions in order to perform the functions of Video Source 1230, Game Server 1225, and/or a Client Qualifier 1260. Video Server System 1220 optionally includes more than one instance of Processor 1250. Processor 1250 may also be programmed with software instructions in order to execute commands received by Video Server System 1220, or to coordinate the operation of the various elements of Game System 1200 discussed herein. Processor 1250 may include one or more hardware device. Processor 1250 is an electronic processor.

Storage 1255 includes non-transitory analog and/or digital storage devices. For example, Storage 1255 may include an analog storage device configured to store video frames. Storage 1255 may include a computer readable digital storage, e.g. a hard drive, an optical drive, or solid state storage. Storage 1215 is configured (e.g. by way of an appropriate data structure or file system) to store video frames, artificial frames, a video stream including both video frames and artificial frames, audio frame, an audio stream, and/or the like. Storage 1255 is optionally distributed among a plurality of devices. In some implementations, Storage 1255 is configured to store the software components of Video Source 1230 discussed elsewhere herein. These components may be stored in a format ready to be provisioned when needed.

Video Server System 1220 optionally further comprises Client Qualifier 1260. Client Qualifier 1260 is configured for remotely determining the capabilities of a client, such as Clients 1210A or 1210B. These capabilities can include both the capabilities of Client 1210A itself as well as the capabilities of one or more communication channels between Client 1210A and Video Server System 1220. For example, Client Qualifier 1260 may be configured to test a communication channel through Network 1215.

Client Qualifier 1260 can determine (e.g., discover) the capabilities of Client 1210A manually or automatically. Manual determination includes communicating with a user of Client 1210A and asking the user to provide capabilities. For example, in some implementations, Client Qualifier 1260 is configured to display images, text, and/or the like within a browser of Client 1210A. In one implementation, Client 1210A is an HMD that includes a browser. In another implementation, client 1210A is a game console having a browser, which may be displayed on the HMD. The displayed objects request that the user enter information such as operating system, processor, video decoder type, type of network connection, display resolution, etc. of Client 1210A. The information entered by the user is communicated back to Client Qualifier 1260.

Automatic determination may occur, for example, by execution of an agent on Client 1210A and/or by sending test video to Client 1210A. The agent may comprise computing instructions, such as java script, embedded in a web page or installed as an add-on. The agent is optionally provided by Client Qualifier 1260. In various implementations, the agent can find out processing power of Client 1210A, decoding and display capabilities of Client 1210A, lag time reliability and bandwidth of communication channels between Client 1210A and Video Server System 1220, a display type of Client 1210A, firewalls present on Client 1210A, hardware of Client 1210A, software executing on Client 1210A, registry entries within Client 1210A, and/or the like.

Client Qualifier 1260 includes hardware, firmware, and/or software stored on a computer readable medium. Client Qualifier 1260 is optionally disposed on a computing device separate from one or more other elements of Video Server System 1220. For example, in some implementations, Client Qualifier 1260 is configured to determine the characteristics of communication channels between Clients 1210 and more than one instance of Video Server System 1220. In these implementations the information discovered by Client Qualifier can be used to determine which instance of Video Server System 1220 is best suited for delivery of streaming video to one of Clients 1210.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method, comprising:
    receiving at least one video feed from at least one camera disposed in a venue;
    processing the at least one video feed to generate a video stream that provides a view of the venue;
    transmitting the video stream over a network to a client device, for rendering to a head-mounted display;
    wherein processing the at least one video feed includes,
        analyzing the at least one video feed to identify a projectile object that is launched in the venue,
        responsive to identifying the projectile object and identifying a virtual location of a user of the head-mounted display in the venue, then replacing the projectile object in the video stream with a virtual object, using the identified virtual location of the user to adjust a path of travel of the virtual object toward the virtual location of the user of the head-mounted display in the venue, and animating the virtual object in the video stream so as to exhibit the path of travel to be towards the user of the head-mounted display as the video stream is rendered to the head-mounted display.

2. The method of claim 1, wherein the replacement of the projectile object with the virtual object and the animation of the virtual object are in response to a detected gesture by the user of the head-mounted display.

3. The method of claim 2, wherein the gesture is defined by raising of a hand of the user.

4. The method of claim 1, wherein analyzing the at least one video feed further includes tracking movement of the projectile object.

5. The method of claim 4, wherein analyzing the at least one video feed further includes using the tracked movement to determine a predicted landing location of the projectile object in the venue.

6. The method of claim 5, wherein the replacement of the projectile object with the virtual object and the animation of the virtual object are in response to the predicted landing location being within a predefined distance of the virtual location of the user of the head-mounted display.

7. The method of claim 6, wherein the view of the venue that is provided by the video stream is from a perspective that is substantially defined by the virtual location of the user of the head-mounted display.

8. The method of claim 7, wherein the virtual location of the user of the head-mounted display is defined by a seat location in the venue.

9. The method of claim 1, wherein the replacement of the projectile object with the virtual object occurs along a trajectory of the projectile object.

10. The method of claim 1, wherein the at least one video feed includes two or more video feeds, and wherein processing the at least one video feed includes stitching the two or more video feeds together.

11. A non-transitory computer readable medium having program instructions embodied thereon that, when executed by at least on computing device, cause said at least one computing device to perform a method including the following operations:
    receiving at least one video feed from at least one camera disposed in a venue;
    processing the at least one video feed to generate a video stream that provides a view of the venue;
    transmitting the video stream over a network to a client device, for rendering to a head-mounted display;
    wherein processing the at least one video feed includes,
        analyzing the at least one video feed to identify a projectile object that is launched in the venue,
        responsive to identifying the projectile object and identifying a virtual location of a user of the head-mounted display in the venue, then replacing the projectile object in the video stream with a virtual object, using the identified virtual location of the user to adjust a path of travel of the virtual object toward the virtual location of the user of the head-mounted display in the venue, and animating the virtual object in the video stream so as to exhibit the path of travel to be towards the user of the head-mounted display as the video stream is rendered to the head-mounted display.

12. The non-transitory computer readable medium of claim 11, wherein the replacement of the projectile object with the virtual object and the animation of the virtual object are in response to a detected gesture by the user of the head-mounted display.

13. The non-transitory computer readable medium of claim 12, wherein the gesture is defined by raising of a hand of the user.

14. The non-transitory computer readable medium of claim 11, wherein analyzing the at least one video feed further includes tracking movement of the projectile object.

15. The non-transitory computer readable medium of claim 14, wherein analyzing the at least one video feed further includes using the tracked movement to determine a predicted landing location of the projectile object in the venue.

16. The non-transitory computer readable medium of claim 15, wherein the replacement of the projectile object with the virtual object and the animation of the virtual object are in response to the predicted landing location being within a predefined distance of the virtual location of the user of the head-mounted display.

17. The non-transitory computer readable medium of claim 16, wherein the view of the venue that is provided by the video stream is from a perspective that is substantially defined by the virtual location of the user of the head-mounted display.

18. The non-transitory computer readable medium of claim 17, wherein the virtual location of the user of the head-mounted display is defined by a seat location in the venue.

19. The non-transitory computer readable medium of claim 11, wherein the replacement of the projectile object with the virtual object occurs along a trajectory of the projectile object.

20. The non-transitory computer readable medium of claim 11, wherein the at least one video feed includes two or more video feeds, and wherein processing the at least one video feed includes stitching the two or more video feeds together.

21. The method of claim 1, wherein replacing the projectile object with the virtual object includes processing the at least one video feed to remove the projectile object in the at least one video feed.

* * * * *